(12) United States Patent
Blayvas et al.

(10) Patent No.: US 6,886,008 B2
(45) Date of Patent: Apr. 26, 2005

(54) MACHINE LEARNING BY CONSTRUCTION OF A DECISION FUNCTION

(75) Inventors: Ilya Blayvas, Haifa (IL); Ron Kimmel, Haifa (IL); Alfred Bruckstein, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 565 days.

(21) Appl. No.: 10/091,565

(22) Filed: Mar. 7, 2002

(65) Prior Publication Data

US 2002/0165854 A1 Nov. 7, 2002

Related U.S. Application Data

(60) Provisional application No. 60/273,840, filed on Mar. 8, 2001.

(51) Int. Cl.$^7$ .............................................. G06F 17/30
(52) U.S. Cl. ................... 707/3; 707/9; 707/10; 707/102; 707/104.1; 345/428; 345/401; 345/581; 370/401; 370/392
(58) Field of Search .............................. 707/2–3, 10, 9, 707/4–5, 102, 104.1; 345/428, 401, 581, 589; 370/401, 392

(56) References Cited

PUBLICATIONS

Haykin, Neural Networks, Prentice–Hall International Inc., 1999, pp. 1–3.
Duda, et al., Pattern Classification, Wiley–Interscience Publication, 2001, Second Edition, pp. 372–375.
Vapnik, Statistical Learning Theory, John Wiley & Sons, Inc., 1998, pp. 420–423.
Tikhonov, et al., Solutions of Ill–Posed Problems, V.H. Winston & Sons, 1977.
Evgeniou, et al., A Unified Framework for Regularization Networks and Support Vector Machines, C.B.C.L. Paper No. 171, Mar. 23, 1999, pp. 1–41.
Garcke, et al., Data Mining with Sparse Grids, Institut für Angewandte Mathematik, pp. 1–27, no date.

*Primary Examiner*—Charles Rones
*Assistant Examiner*—Belix M. Ortiz
(74) *Attorney, Agent, or Firm*—G.E. Ehrlich (1995) Ltd.

(57) ABSTRACT

Data processing apparatus is provided for evaluating answers to respective query items considered to be represented by respective points within a region of feature space, and the apparatus comprises an input (10) which receives such a query item. The region is subdivided into subregions according to at least first and second subdivisions. A subregion identifying portion (20) identifies, for each such subdivision of the region, which subregion of the subdivision contains the point representing the received query item. A partial answer retrieval portion (30) has access when the apparatus is in use to a store (40) of precalculated partial answers for at least some the subregions of the subdivisions, and retrieves from the store the partial answers for the or each identified subregion that is present in the store. An answer calculation portion (50) calculates an answer to the received query item based on the retrieved partial answers, and an output (60) outputs the calculated answer.

38 Claims, 19 Drawing Sheets

FIG. 25

|  | Interpolation | Approximation |
|---|---|---|
| Training time (sec) | $24.8 \cdot 10^{-6}$ | $24.8 \cdot 10^{-6}$ |
| Query time (sec) | $11.62 \cdot 10^{-6}$ | $16.35 \cdot 10^{-3}$ |
| Memory required, (kbyte) | 20 | 20 |
| Train performance (%) | 100.0 | 77.60 |
| Query performance (%) | 70.5 | 76.16 |

FIG. 26

| Results of Garcke et al | # of points | training correctness | Testing correctness | runtime, sec | | |
|---|---|---|---|---|---|---|
| Level 1 | 5x10⁴ | 87.9 | 88.1 | 158 | | |
| | 5x10⁵ | 88.0 | 88.1 | 1570 | | |
| | 5x10⁶ | 88.0 | 88.0 | 15933 | | |
| Level 2 | 5x10⁴ | 89.2 | 89.3 | 1155 | | |
| | 5x10⁵ | 89.4 | 89.2 | 11219 | | |
| | 5x10⁶ | 89.3 | 89.2 | 112656 | | |
| Results of This Work | # of points train & test | training correctness | Testing correctness | train time, sec | test time, sec | memory used |
| Level 1 | 50k & 50k | 86.2 | 86.2 | 0.35 | 0.25 | 3.1k |
| | 500k & 500k | 86.4 | 86.5 | 3.4 | 2.4 | 3.1k |
| Level 2 | 50k & 50k | 91.6 | 89.3 | 0.75 | 0.45 | 163k |
| | 500k & 500k | 90.7 | 90.5 | 9.5 | 4.5 | 197k |
| Level 3 | 50k & 50k | 98.2 | 88.8 | 1.55 | 0.85 | 1.53M |
| | 500k & 500k | 95.4 | 90.6 | 16.5 | 9.5 | 5.40M |
| Level 4 | 50k & 50k | 99.9 | 88.8 | 2.05 | 1.15 | 3.86M |
| | 500k & 500k | 99.5 | 90.3 | 21.5 | 12.5 | 24.7M |
| Level 5 | 50k & 50k | 100.0 | 88.8 | 2.55 | 1.25 | 6.26M |
| | 500k & 500k | 100.0 | 90.3 | 28.5 | 15.5 | 48.6M |

US 6,886,008 B2

MACHINE LEARNING BY CONSTRUCTION OF A DECISION FUNCTION

RELATIONSHIP TO EXISTING APPLICATIONS

The present application claims priority from U.S. Provisional Patent Application No. 60/273,840 filed on 8th Mar. 2001.

BACKGROUND OF THE INVENTION

1. Field of the Invention

The present invention relates to machine learning techniques. More particularly to the techniques of construction and training of the machine using a training set that consist of ordered pairs of given queries and answers. Upon completion of the training, the machine should be able to provide an answer to any query from the space spanned in some sense by the set of training queries.

2. Description of the Related Art

The techniques generally referred to as 'Learning machines' include, among others, Neural Networks, Evolutionary Methods (including Genetic Algorithms) and Support Vector Machines.

The applications of learning machines are, to list a few, Speech-, Image-, Character- and Pattern-Recognition and Data Mining. Various new applications of machine learning may emerge as more efficient learning machines will appear.

Here we present examples of prior art and first quote the definition of the neural network from p.2 of "Neural Networks" by Haykin (Prentice Hall, 1999), the entire content of which is herein incorporated by reference:

'A neural network is a massively parallel distributed processor made up of simple processing units, which has a natural propensity for storing experimental knowledge and making it available for use. It resembles the brain in two respects:

1. Knowledge is acquired by the network from its environment through a learning process.
2. Interneuron connection strengths, known as synaptic weights, are used to store the acquired knowledge.'

The definition of the evolutionary methods, quoted from p.373 of "Pattern Classification", by Stork, Duda and Hart (J.Wiley & Sons, 2000), the entire content of which is herein incorporated by reference, is:

'Inspired by the process of biological evolution, evolutionary methods of classifier design employ stochastic search for an optimal classifier . . .'.

Both of these families of techniques utilize differential or statistical optimizers to implement the respective learning machine. Implicit in these definitions is the fact that prior art learning machines have a fixed internal structure containing a set of free parameters. Learning is implemented by a procedure of updating of these parameters.

Shortcomings of such a fixed internal structure derive from the fact that it is impossible to know in advance the most appropriate internal structure for the learning problem. The examples of such shortcomings are under-fitting and over-fitting. Some of the shortcomings of the procedures of parameter update are the local minima phenomena and the long learning time.

We wish to express the opinion that many of the shortcomings of learning machines from the families of Neural Networks and Evolutionary Methods owed to the fact that the architecture as well as the parameter update procedure of these learning machines was inspired by a desire to mimic biological mechanisms. However, these need not necessarily the most appropriate for implementation in an inanimate machine.

The idea of Support vector Machines (SVM), quoted from p.421 of "Statistical Learning theory" by Vapnik (J.Wiley & Sons, 1998), the entire content of which is herein incorporated by reference, is:

'It (SVM) maps the input vector f into the high-dimensional 'feature space' Z through some nonlinear mapping, chosen a priori. In this space, an optimal separating hyperplane is constructed'.

Some of the shortcomings of SVM are the following: It is impossible to guarantee that the nonlinear mapping which has been a priori chosen will make the classes linearly separable by a hyperplane. The computational complexity of finding an optimal separating hyperplane can be high. The class label that results from the separation has only one bit value which, in many cases, is insufficient information.

The state of the prior art shortly introduced above is described, in much more detail in: Haykin; Stork, Duda and Hart; and Vapnik (see above for reference details).

The problem of machine learning is also referred to as the problem of recovering or approximating a multivariate function from sparse data, which are indeed the training set mentioned above. However such a problem is recognized to be an ill-posed problem and in order to solve it regularization theory and variational analysis are involved, for which see "Solutions of Ill-Posed Problems" by Tichonov and Arsenin (W. H.Winston, 1977), the entire content of which is herein incorporated by reference. The shortcomings of these approaches are local minima phenomena and unduly large computational complexity. Recent papers on these topics are: "A unified framework for regularization networks and support vector machines" by Evgeniou, Pontil and Poggio (Technical Report AI Memo No. 1654, MIT, 1999); and "Data Mining with Sparse Grids" by Gabriel, Garcke and Thess (Bonn University & Computing, 2000), the entire contents of which are herein incorporated by reference. In particular the treatment in the paper by Evgeniou, Pontil and Poggio, using the regularization technique, translates the problem into an SVM solution. Reference Gabriel, Garcke and Thess, using the variational technique, is thwarted by complexity even with relatively small dimensions of the feature space.

SUMMARY OF THE INVENTION

An embodiment of one aspect of the present invention provides data processing apparatus for evaluating answers to respective query items considered to be represented by respective points within a region of feature space. The region of feature space is considered to be subdivided into subregions according to at least first and second subdivisions. An input receives such a query item. A subregion identifying portion is operable, for each subdivision of the region, to identify which subregion of the subdivision contains the point representing the received query item. A partial answer retrieval portion has access when the apparatus is in use to a store of precalculated partial answers for at least some of the subregions of the subdivisions, and is operable to retrieve from the store the partial answers for the or each identified subregion that is present in the store. An answer calculation portion calculates an answer to the received query item based on the retrieved partial answers. An output outputs the calculated answer.

In such data processing apparatus, the answer calculation portion preferably calculates an answer to the received query item by summing the retrieved partial answers. One of the subdivisions preferably contains a single subregion which preferably covers the whole of the region of feature space under consideration. Each subdivision preferably represents a particular level of resolution and the region of feature space is subdivided into subregions of a particular size according to the level of resolution for the subdivision concerned. In this case, the second subdivision preferably has a higher level of resolution than the first subdivision, and so on for further subdivisions, if any. The region of feature space may be subdivided into $2^{LD}$ subregions, where L is the level of resolution and D is the dimension of feature space. The subregions of any one subdivision may be non-overlapping with another subregion of that subdivision. The partial answer retrieval portion is preferably operable to retrieve from the store further partial answers for one or more subregions surrounding the or each subregion identified by the subregion identifying portion, and the answer calculation portion then calculates an answer to the received query item based on the retrieved partial answers for all such subregions. The answer calculation portion may calculate an answer to the received query item by forming a weighted sum of the retrieved partial answers, the weight for a particular partial answer being set in dependence upon the distance of the surrounding subregion associated with that partial answer from the subregion identified by the subregion identifying portion. In an embodiment of the present invention the answer may be considered to be represented by a point within a region output space of one or more dimensions. A query may item may comprise a set of measurement values and the answer may represent a class assignment or decision based on those measurement values. The apparatus may be a learning machine which approximates an arbitrary decision function.

An embodiment of another aspect of the present invention provides data training apparatus for analysing query items, considered to be represented by respective training points within a region of feature space, and respective known answers to the query items to determine partial answers for use in evaluating answers to new query items. A region subdividing portion is operable to subdivide the region into subregions according to at least first and second subdivisions. An iteration portion performs at least first and second iterations, corresponding respectively to the first and second subdivisions, and is operable in each iteration to calculate a partial answer for each subregion of the corresponding subdivision in dependence upon known answers to query items represented by training points, if any, in the subregion concerned. The iteration portion is also operable to adjust the known answers in dependence upon those partial answers so that the adjusted known answers are usable by a subsequent iteration, if any. An output which outputs the calculated partial answers.

The partial answer for each subregion is preferably calculated as the average of all the known answers to query items represented by training points, if any, in the subregion concerned. The iteration portion may be operable in each iteration to calculate a partial answer for each subregion of the corresponding subdivision in dependence both upon known answers to query items represented by training points, if any, in the subregion concerned and upon known answers to query items represented by training points, if any, in one or more subregions surrounding the subregion concerned. The iteration portion may operable in each iteration to calculate a count value for each subregion of the corresponding subdivision in dependence upon the number of known answers to query items represented by training points, if any, in the subregion concerned; in this case the apparatus may further comprise an additional output which outputs the calculated count values. The known answers are preferably adjusted by subtracting from them the corresponding respective partial answers. The data training apparatus may further comprises a storage portion which is operable to store the calculated partial answers. This storage portion may allocate a storage location within the storage portion to hold a partial value for a subregion only if that subregion has at least one query item represented by a training point in the subregion. For this purpose the storage portion may be of a sparse grid type.

An embodiment of another aspect of the present invention provides data updating apparatus for analysing training query items and respective known answers to the training query items. The training query items may be considered to be represented by respective training points within a region of feature space and the region may be considered to be subdivided into subregions according to at least first and second subdivisions. The data updating apparatus is for updating precalculated partial answers which are usable to evaluate answers to new query items. An input receives such a training query item. A subregion identifying portion is operable, for each subdivision of the region, to identify which subregion of the subdivision contains the point representing the received training query item. A partial answer retrieval portion has access when the apparatus is in use to a store of precalculated partial answers for at least some the subregions of the subdivisions, and is operable to retrieve from the store the partial answers for the or each identified subregion that is present in the store. An iteration portion performs at least first and second iterations, corresponding respectively to the first and second subdivisions, and is operable in each such iteration to update the partial answer stored for the identified subregion of the corresponding subdivision in dependence upon the known answer to the received training query item and the retrieved precalculated partial answer for the identified subregion. The iteration portion is also operable to adjust the known answer in dependence upon that updated partial answer so that the adjusted known answer is usable by a subsequent iteration, if any.

The iteration portion may be further operable in each such iteration to update the partial answer stored for one or more subregions surrounding the identified subregion. The data updating apparatus may also further comprise a count value retrieval portion having access when the apparatus is in use to a store of precalculated count values for at least some the subregions of the subdivisions; such apparatus would be operable to retrieve from the store the count values for the or each identified subregion that is present in the store, and wherein the iteration portion would be operable in each such iteration to update the partial answer stored for the identified subregion of the corresponding subdivision in dependence upon the known answer to the received training query item, the retrieved precalculated partial answer for the identified subregion, and the retrieved count value for the identified subregion. The partial answer would then preferably be updated by calculating a first value equal to the known answer minus the partial answer and a second value equal to the count value plus one, and adding to the partial answer the result of the first value divided by the second value. The iteration portion would also preferably be operable to update the count value stored for the identified subregion of the corresponding subdivision in dependence upon the retrieved count value for the identified subregion. The count value stored for the identified subregion can be updated by incrementing it. The known answer can be adjusted by subtracting from it the updated partial answer.

An embodiment of another aspect of the present invention provides a data processing method for evaluating answers to respective query items considered to be represented by respective points within a region of feature space, which region is subdivided into subregions according to at least first and second subdivisions. The method comprises: receiving such a query item; identifying, for each subdivision of the region, which subregion of the subdivision contains the point representing the received query item; accessing a store of precalculated partial answers for at least some subregions of the subdivisions to retrieve from the store the partial answers for the or each identified subregion that is present in the store; calculating an answer to the received query item based on the retrieved partial answers; and outputting the calculated answer. The data processing method is preferably computer-implemented.

An embodiment of another aspect of the present invention provides a data training method for analysing query items, considered to be represented by respective training points within a region of feature space, and respective known answers to the query items to determine partial answers for use in evaluating answers to new query items. The method comprises: subdividing the region into subregions according to at least first and second subdivisions; performing at least first and second iterations, corresponding respectively to the first and second subdivisions, and in each iteration calculating a partial answer for each subregion of the corresponding subdivision in dependence upon known answers to query items represented by training points, if any, in the subregion concerned and adjusting the known answers in dependence upon those partial answers so that the adjusted known answers are usable by a subsequent iteration, if any; and outputting the calculated partial answers. The data processing method is preferably computer-implemented.

An embodiment of another aspect of the present invention provides a data updating method for analysing training query items and respective known answers to the training query items, the training query items being considered to be represented by respective training points within a region of feature space and the region being subdivided into subregions according to at least first and second subdivisions, to update precalculated partial answers usable to evaluate answers to new query items. The method comprises: receiving such a training query item; identifying, for each subdivision of the region, which subregion of the subdivision contains the point representing the received training query item; accessing a store of precalculated partial answers for at least some subregions of the subdivisions to retrieve from the store the partial answers for the or each identified subregion that is present in the store; and performing at least first and second iterations, corresponding respectively to the first and second subdivisions, and in each such iteration updating the partial answer stored for the identified subregion of the corresponding subdivision in dependence upon the known answer to the received training query item and the retrieved precalculated partial answer for the identified subregion, and adjusting the known answer in dependence upon that updated partial answer so that the adjusted known answer is usable by a subsequent iteration, if any.

An embodiment of another aspect of the present invention provides a computer-readable recording medium storing a program for evaluating answers to respective query items considered to be represented by respective points within a region of feature space, which region is subdivided into subregions according to at least first and second subdivisions. A receiving code portion of the program receives such a query item. A subregion identifying code portion identifies, for each subdivision of the region, which subregion of the subdivision contains the point representing the received query item. A partial answer retrieval code portion accesses a store of precalculated partial answers for at least some subregions of the subdivisions to retrieve from the store the partial answers for the or each identified subregion that is present in the store. An answer calculation code portion calculates an answer to the received query item based on the retrieved partial answers. An output code portion outputs the calculated answer.

An embodiment of another aspect of the present invention provides a computer-readable recording medium storing a program for analysing query items, considered to be represented by respective training points within a region of feature space, and respective known answers to the query items to determine partial answers for use in evaluating answers to new query items. A region subdividing code portion of the program subdivides the region into subregions according to at least first and second subdivisions. An iteration code portion performs at least first and second iterations, corresponding respectively to the first and second subdivisions. In each iteration the iteration code portion calculates a partial answer for each subregion of the corresponding subdivision in dependence upon known answers to query items represented by training points, if any, in the subregion concerned and adjusts the known answers in dependence upon those partial answers so that the adjusted known answers are usable by a subsequent iteration, if any. An output code portion outputs the calculated partial answers.

An embodiment of another aspect of the present invention provides a computer-readable recording medium storing a program for analysing training query items and respective known answers to the training query items, the training query items being considered to be represented by respective training points within a region of feature space and the region being subdivided into subregions according to at least first and second subdivisions, to update precalculated partial answers usable to evaluate answers to new query items. An input code portion receives such a training query item. A subregion identifying code portion identifies, for each subdivision of the region, which subregion of the subdivision contains the point representing the received training query item. A partial answer retrieval code portion accesses a store of precalculated partial answers for at least some subregions of the subdivisions to retrieve from the store the partial answers for the or each identified subregion that is present in the store. An iteration code portion performs at least first and second iterations, corresponding respectively to the first and second subdivisions, and in each such iteration updates the partial answer stored for the identified subregion of the corresponding subdivision in dependence upon the known answer to the received training query item and the retrieved precalculated partial answer for the identified subregion, and adjusts the known answer in dependence upon that updated partial answer so that the adjusted known answer is usable by a subsequent iteration, if any.

An embodiment of another aspect of the present invention provides a computer-readable recording medium storing partial answers created by a computer-implemented data training method for analysing query items, considered to be represented by respective training points within a region of feature space, and respective known answers to the query items to determine partial answers for use in evaluating answers to new query items. The method comprises: subdividing the region into subregions according to at least first and second subdivisions; performing at least first and second iterations, corresponding respectively to the first and second subdivisions, and in each iteration calculating a partial answer for each subregion of the corresponding subdivision in dependence upon known answers to query items represented by training points, if any, in the subregion concerned and adjusting the known answers in dependence upon those partial answers so that the adjusted known answers are usable by a subsequent iteration, if any; and outputting the calculated partial answers.

Major contributions of the invention are:

1. The approach to the machine learning problem as to the problem of construction of the multidimensional function, approximating the values of the training set. The query is the evaluation of thus constructed function.

2. An efficient procedure for construction of a multidimensional interpolation function, interpolating the values of the points scattered in the multidimensional space. An efficient procedure for construction of a multidimensional approximation function, approximating the values of the points, scattered in the multidimensional space. The procedure is based on multiresolution approximation, where the average of the scattered points is calculated inside subregions of successively decreasing size. The subregions, containing the points with different values are divided again. The empty subregions or the subregions with the points of the same value are not divided.

This multi-resolution interpolation procedure is asymptotically more efficient than existing methods.

The present invention goes along the idea to treat machine learning as the problem of approximating a multivariate function from the training set data. In order to bypass the shortcomings of prior approaches, we disclose a direct construction of the decision function that allows online learning with but a few operations per training sample, furthermore the thus constructed decision function requires memory for storage proportional only to the complexity of the training set and not to its size. Other advantages of the invention are apparent from the presentation below.

BRIEF DESCRIPTION OF THE DRAWINGS

FIG. 25 is a table showing the results of a classification test using the Pima Indians Diabetes dataset; and FIG. 26 is a table showing the results of a classification test using an artificially-generated dataset in six-dimensional feature.

DETAILED DESCRIPTION OF THE PREFERRED EMBODIMENTS

1. First Embodiment

Figure 1:
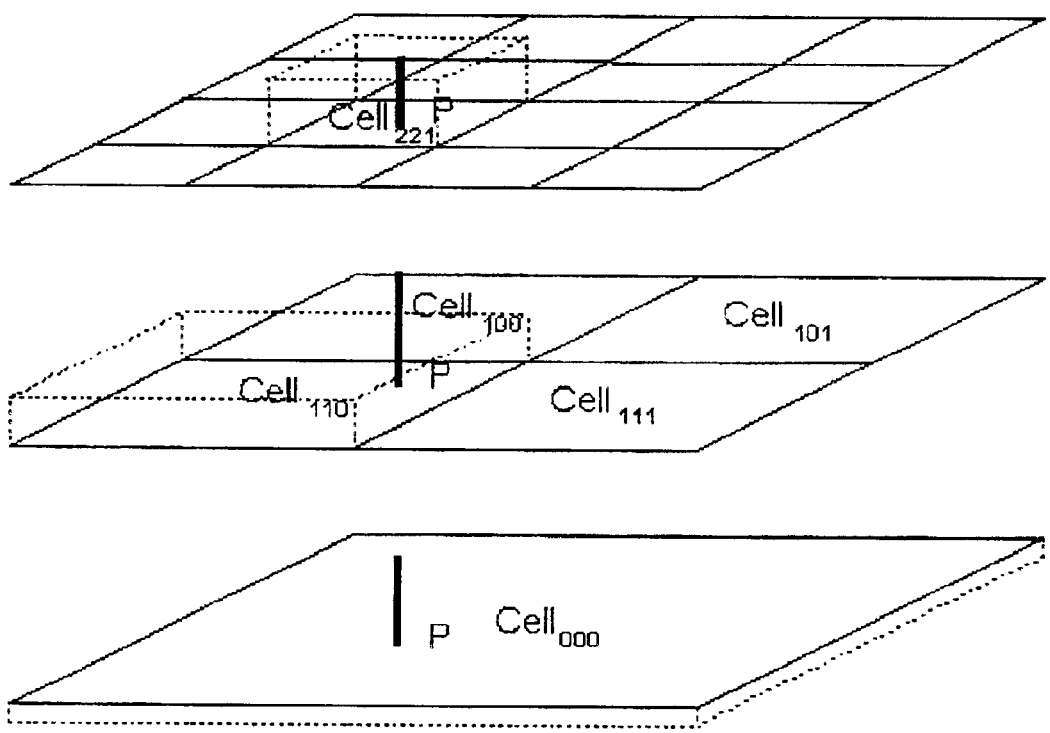
FIG. 1 shows an example of the hierarchy of subregions in an embodiment of the present invention for two-dimensional feature space.

For the first embodiment the problem of machine learning will be defined as the problem of providing an answer g, associated with an arbitrary query $f$ on the basis of a given training set T that consists of ordered pairs of given queries and answers, that is $T=\{f_l,g_l\}_{l=1}^{|T|}$. Any query belongs to the space of queries or feature space $F: f \in F \subset R^n$ and any answer belongs to the space of answers or class assignment space G: $g \in G \subset R^m$. Obviously $T \in F \times G$. An ordered pair $\{f_l,g_l\} \in T$ will be referred to as a training point.

We propose to solve the problem of computer learning by construction of a function D from the feature space F to the class assignment space $$G: F \xrightarrow{D} G.$$

The function D will be referred to as the Decision Function.

The decision function has the following preferred set of properties:

1. To any query $f \in F$ a value $g=D(f)$ is provided. This value shall be interpreted as a 'soft decision' of the class assignment.
2. D is deterministically constructed on the basis of the training set $T=\{f_l,g_l\}_{l=1}^{|T|}$, using simple arithmetic calculations.
3. Any new training point $\{f_l,g_l\}$ updates the decision function in a number of computations essentially independent of the number of training points, which were already processed.

4. The memory required for storage of D depends essentially on the complexity of the training set and not on its size.

5. D can be evaluated for any query $f \in F$ with just a few arithmetic calculations, in a time essentially independent on the size or complexity of D.

In the description that follows, the feature space is treated as a unit cube in the n-dimensional Euclidian space: $F \equiv 1^n$, and the output space as an interval in $R^1: G \equiv [-1,1]$. The generalization to other spaces should be clear to anyone ordinarily skilled in the art.

The training phase of the learning machine is implemented as the construction of D. A preferred way to construct the decision function D is in the following steps:

1. The number $n_0$ of the points in the training set is counted. The average value $a_0$ of all the training points is calculated. Index$_0$ refers to the zeroth level of resolution.

2. The value of each training point is updated according to the rule: $g_l^{(l)} = g_l - a_0$. Values $g_l^{(l)}$ will be referred to as first order residuals of the training points at the (1)-st resolution level.

3. The region F is divided into smaller subregions, say $F_{1j}$. The subscript 1 refers to the (1)-st resolution level, while the subscript j refers to the specific subregion of F at this level, $j=1, \ldots, J_1$, where $J_1$ is the number of subregions at the (1)-st resolution level.

4. The number of the training points $n_{lj}$ inside each of the subregions $F_{lj}$ is counted. The average $a_{lj}$ of the first order residuals $g_l^{(l)}$ is calculated inside each subregion.

5. This procedure is iterated by defining finer subregions, $F_{lj}$ at the resolution level l where j indicates the specific subregion. There are $J_l$ subregions at the resolution level l: $j=1, \ldots, J_l$. The number $n_{lj}$ of the training points and the average $a_{lj}$ of their residuals inside each subregion $F_{lj}$ are calculated and stored. The value of each training point is updated according to the rule: $g_l^{(l+1)} = g_l^{(l)} - a_{lj}$.

The answer to a query is implemented as the evaluation of D. A preferred way to evaluate the value g of the decision function D at an arbitrary query f, $g = D(f)$ is the following:

1. The subscript $lj_l$ of the subregion $F_{lj_l}$ that contains the query $f$ at resolution level l is identified for each l.

2. The value g is:

$$g = D(f) = \sum_{l=0}^{L} a_{lj_l}$$

The on-line learning is implemented as the update of D by a new training point. The decision function can be updated whenever a new training point $\{f, g\}$ is available. This can be done in many ways, a preferred one being:

1. The $a_0$ and $n_0$ and g are updated as follows:

$$a_0' = a_0 + \frac{g - a_0}{n_0 + 1}, \quad (1)$$

$$n_0' = n_0 + 1$$

$$g^{(1)} = g - a_0'$$

2. The index$_{lj_l}$ of the cell that contains $f$ at level 1 is identified.

3. The $a_{lj_l}$, $n_{lj_l}$ and $g^{(l)}$ are updated as follows:

$$a_{1j_1}' = a_{1j_1} + \frac{g^{(1)} - a_{1j_1}}{n_{1j_1} + 1}, \quad (2)$$

$$n_{1j_1}' = n_{1j_1} + 1$$

$$g^{(2)} = g^{(1)} - a_{1j_1}'$$

4. Steps 2 and 3 are repeated until $g^l = 0$ or up to the predefined highest level of resolution.

FIG. 1 shows one specific example of two-dimensional feature space $F \subset R^2$. The subscript j of coefficients $a_{lj}$ and $n_{lj}$ is written as two subscripts $j_1 j_2$, each for single spatial dimension. Each region is divided into four subregions. Three levels of resolution l=0,1,2 are shown. The sample point, named P, shown on the figure, belongs to cell$_{000}$ at level 0 (as every point does), cell$_{100}$ at level 1, to cell cell$_{211}$ at level 2. The value of the decision function at this point will be defined only by the decomposition coefficients $a_{000}$, $a_{100}$ and $a_{211}$. Of course, there are infinitely many other possible subdivisions of F.

Figure 2:
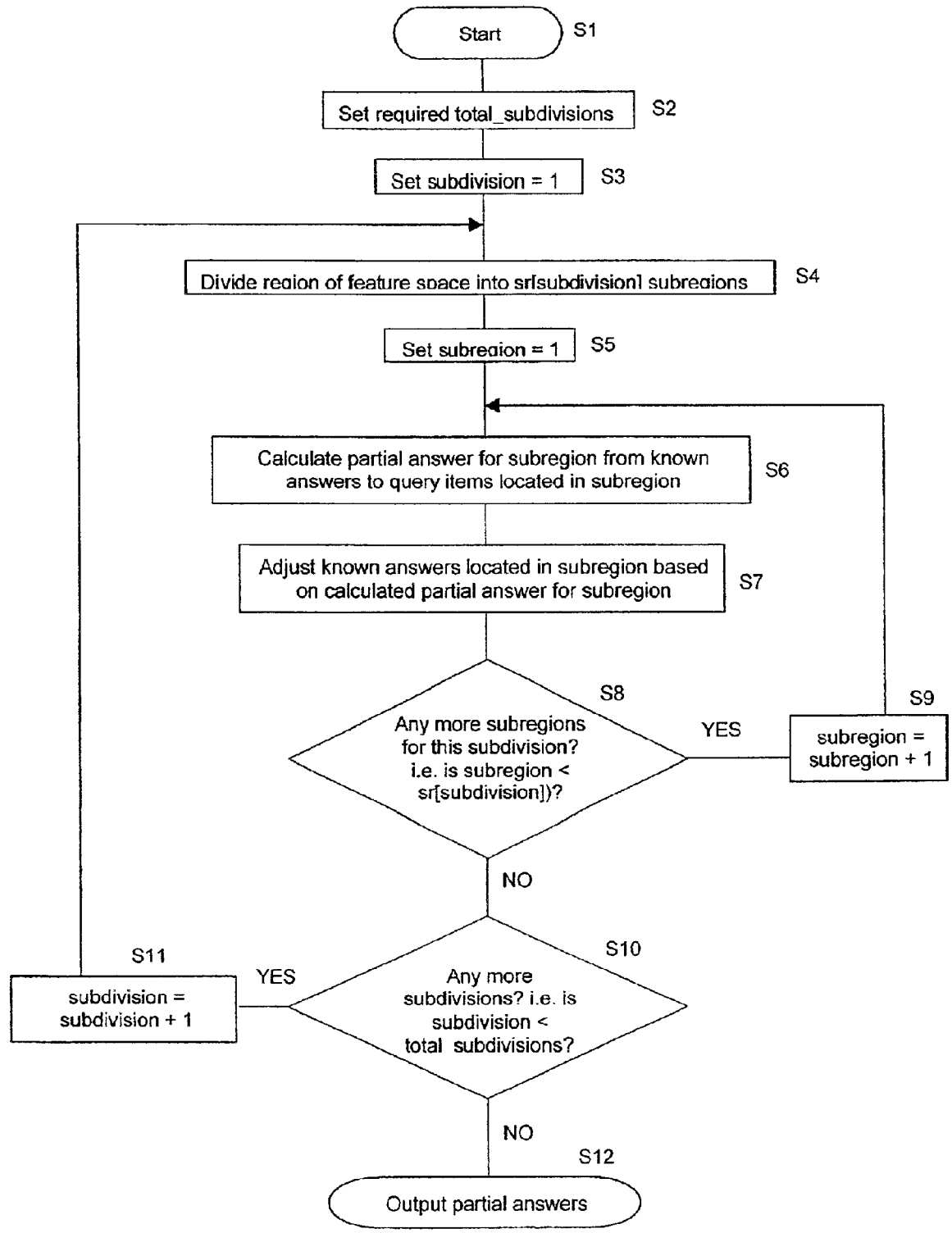
FIG. 2 is a flowchart illustrating the steps performed by data training apparatus embodying the present invention.

FIG. 2 is a flowchart which summarizes the steps mentioned above used to perform the training phase of a learning machine for the construction of a decision function. In such a data training method embodying the present invention, query items and respective known answers to those query items are analysed to determine a plurality of "partial answers". The partial answers are used in evaluating answers to new query items presented after the training phase. The query items are considered to be represented by respective training points within a region of feature space as mentioned above. In the method a series of iterations is performed as explained below.

The method begins at step S1. In step S2 the total number of subdivisions "total_subdivisions" is set to a value desired by the user. The "levels of resolution" mentioned above are examples of these subdivisions, and in that case the value of "total_subdivisions" may represent the maximum level of resolution desired. In step S3, a counter "subdivision" is set to the value 1. The region of feature space is subdivided into a number of subregions in step S4. The number of subregions depends upon the subdivision, or level of resolution, being processed at the time. This number can be accessed from a store represented here by an array "sr[i]", where "i" is the subdivision concerned. In step S5 a counter "subregion" is set to the value 1.

The main part of the iteration is performed in steps S6 and S7. In step S6 a partial answer is calculated for the subregion identified by the values of "subregion" and "subdivision" in dependence upon known answers to query items represented by training points, if any, in the subregion concerned. In step S7 the known answers located in this subregion are updated in dependence upon the calculated partial answer for use in the subsequent iteration, if any. These updated answers are examples of the 'residuals' mentioned above.

It is determined in step S8 whether there are any more subregions to be processed for the subdivision, or level of resolution, concerned. This is done by determining whether "subregion" is less than "sr[subdivision]". If so, then there are further subregions for this subdivision; in this case the value of "subregion" is incremented in step S9 to move processing to the next subregion, and processing is returned to step S6. If "subregion" is determined in step S8 not to be less than "sr[subdivision]", then there are no more subregions for this subdivision and processing continues to step S10.

In step S10 it is determined whether there are any more subdivisions, or levels of resolution, to process. This is done by determining whether "subdivision" is less than "total_subdivision". If so, then there are further subdivisions to process; in this case the value of "subdivision" is incremented in step S11 and another iteration is started by returning processing to step S4. If "subdivision" is determined in step S10 not to be less than "total_subdivision", then there are no more subdivisions, or levels of resolution, to process, and processing continues to step S12. In step S12 the calculated partial answers are outputted. These partial answers can be stored in a store of partial answers for later use in data processing apparatus for evaluating answers to new query items as described below.

As part of the training process described above, it is stated that in step S4 the region of feature space is divided, for each subdivision (or level of resolution) into a number subregions. It will be appreciated that this is a notional step and need not be carried out as a separate physical step. All that is necessary is that the subregions are somehow defined in advance of steps S6 and S7 so that the subregions can be taken in turn and it can be determined which query items belong to a particular subregion.

It will also be appreciated that one of the subdivisions referred to above in the training process with reference to FIG. 2 may in fact contain only a single subregion, so that the value of "sr[subdivision]" accessed in step S4 would be 1. That single subregion occupies the whole of the region of feature space under consideration. This subdivision (no division at all) would correspond to the "zeroth level of resolution" referred to previously and would contain all the training query items if the region is set up correctly. It will be appreciated, though, that it is not essential to have such a region defined which covers all feature space by itself. The "zeroth level of resolution" could, taking the example shown in FIG. 1, be the subdivision where the region of feature space is divided up into four subregions.

Although in the above embodiments the feature space is divided up into subregions at a number of different resolutions, with each subdivision being of a different resolution, it will be appreciated that it is also possible to have two subdivisions in which the region is divided up according to the same resolution. In this case, for example, the subregions of one subdivision could be the same or similar in size to the subregions of another subdivision, but overlap with the subregions of that other subdivision. A mixture of same-resolution and different-resolution subdivisions can also be used.

Figure 3:
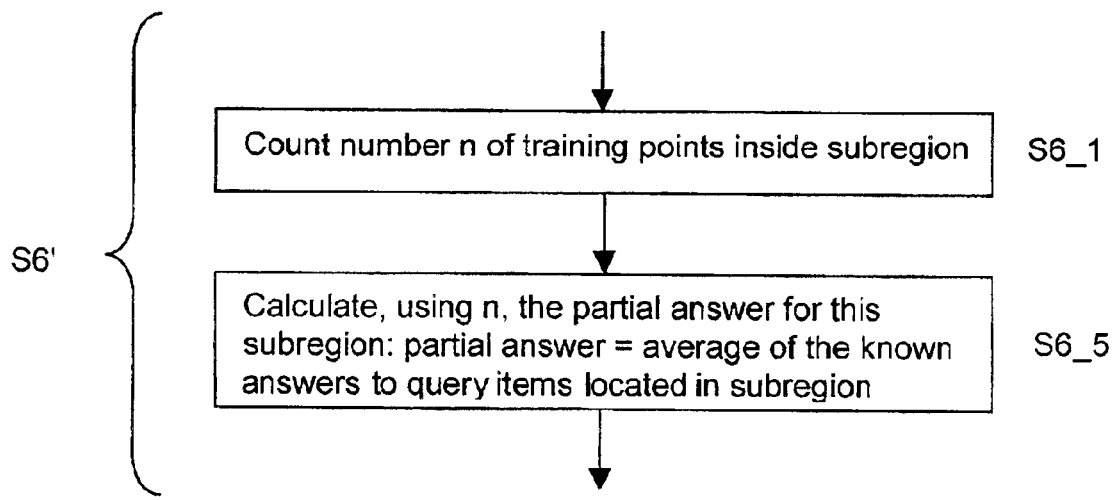
FIG. 3 is a flowchart illustrating in more detail one way of carrying out step S6 of FIG. 2.

FIG. 3 is a flowchart illustrating in more detail one way of carrying out step S6 of FIG. 2 (calculating the partial answer for the subregion concerned from known answers to query items located in the subregion). Step S6' in FIG. 3 corresponds to step S6 in FIG. 2 and is formed of a combination of two steps S6_1 and S6_5. In step S6_1 the number n of training points inside the subregion concerned is counted. In step S6_5 this number n is used to calculate the average of all known answers (as adjusted in any previous iteration) located in the subregion. This average is the partial answer for the subregion.

Figure 4:
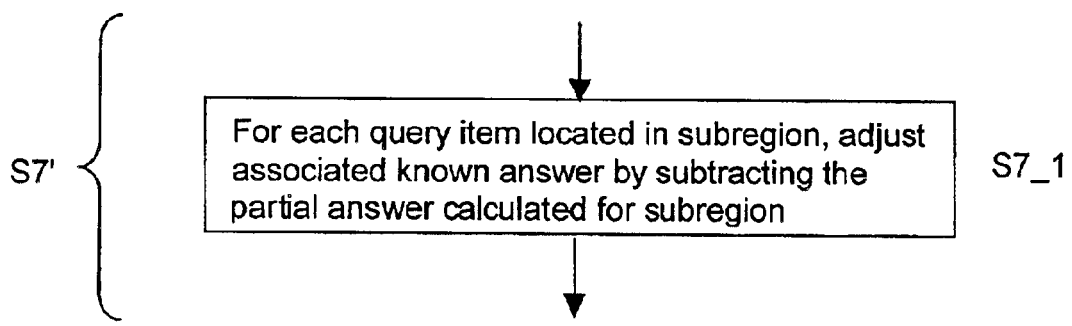
FIG. 4 is a flowchart illustrating in more detail one way of carrying out step S7 of FIG. 2.

FIG. 4 is a flowchart illustrating in more detail one way of carrying out step S7 of FIG. 2 (adjusting the known answers of any query items located in the subregion concerned). Step S7' in FIG. 4 corresponds to step S7 in FIG. 2 and is formed of a single step S7_1. In step S7_1, for each query item located in the subregion, its associated known answer is adjusted by subtracting from it the partial answer calculated in step S6. These adjusted known answers are used in the next iteration, if any.

Figure 5:
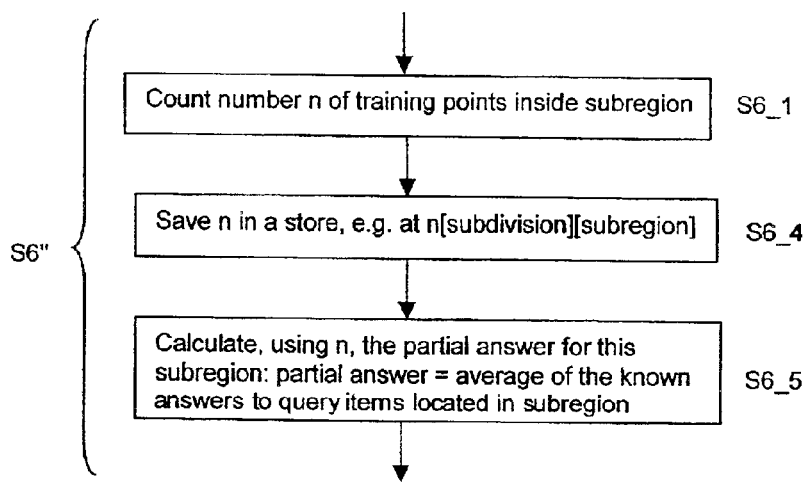
FIG. 5 is a flowchart illustrating in more detail another way of carrying out step S6 of FIG. 2.

FIG. 5 is a flowchart illustrating in more detail another way of carrying out step S6 of FIG. 2 (calculating the partial answer for the subregion concerned from known answers to query items located in the subregion). Step S6" in FIG. 3 corresponds to step S6 in FIG. 2 and is formed of a combination of three steps S6_1, S6_4 and S6_5. In step S6_1 the number n of training points inside the subregion concerned is counted. In the subsequent step S6_4 this number n is saved to a store at a location associated with the subregion concerned. For example it could be stored in a memory or array at a location n[subdivision][subregion]. Alternatively, the numbers n could be output from the apparatus for use by other apparatus. The purpose of storing or outputting these numbers n will become apparent below when there is described a method of "on-line" updating of a previously-trained learning machine. In step S6_5 the number n from step S6_1 is used to calculate the average of all known answers (as adjusted in any previous iteration) located in the subregion. This average is the partial answer for the subregion.

Figure 6:
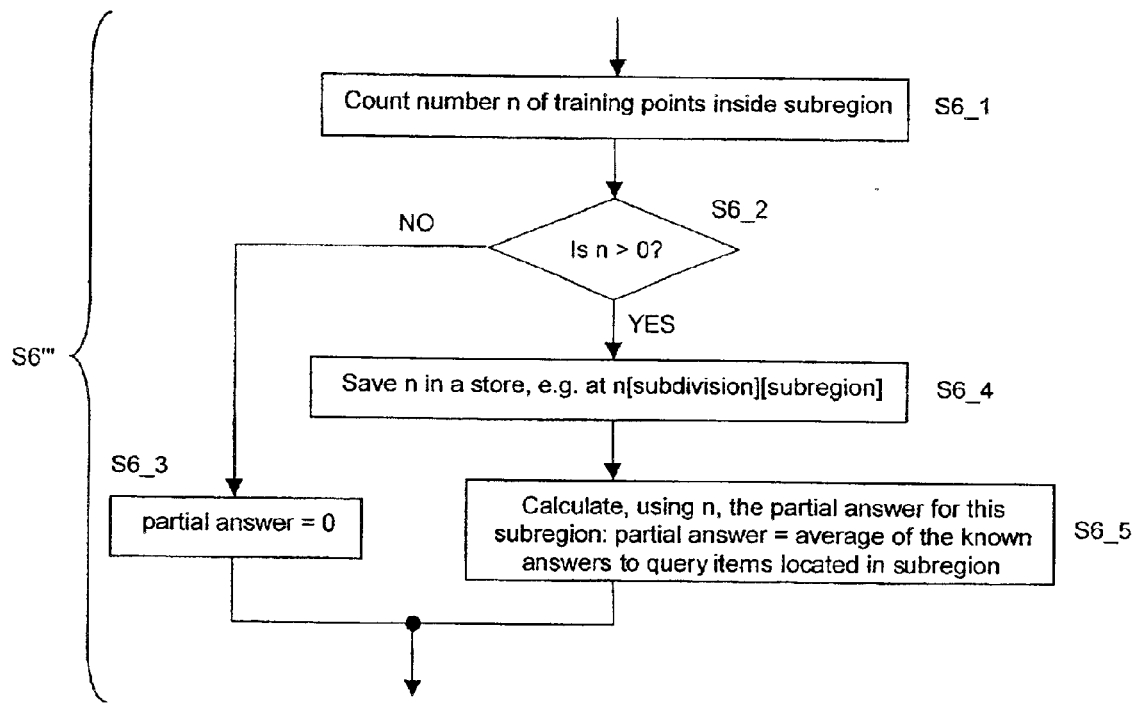
FIG. 6 is a flowchart illustrating in more detail another way of carrying out step S6 of FIG. 2.

An alternative to the process shown in FIG. 5 is that illustrated in the flowchart of FIG. 6. In FIG. 6, Step S6''' corresponds to step S6 in FIG. 2 and is formed of a combination of steps S6_1, S6_2, S6_3, S6_4 and S6_5. Steps S6_1, S6_4 and S6_5 correspond to the same-numbered steps described above with reference to FIG. 5. The process illustrated in FIG. 6 differs from that shown in FIG. 5 by having an extra step S6_2 in which it is determined whether n>0, i.e. whether there are any training points located in the subregion being processed. Only if n>0 is it actually saved in the store in step S6_4. Otherwise, when n=0, processing passes to step S6_3 in which the partial answer is deemed to be zero without the need to perform any further calculation such as that which is performed in step S6_5 if n>0.

Not only does this save processing time if there are no query items in the subregion, it can also lead to reduction in the amount of storage needed since, as step S6_4 is by-passed when n=0, there is no need to store any values relating to the subregion concerned.

Also, since it is not necessary to calculate a partial answer for the subregion (it is automatically zero) it is also not necessary to output in step S12 of FIG. 2 the partial answer for such a subregion where n=0, or to store it for later use. This leads to a further reduction in the amount of storage required.

Finally, if it is known that there are no training points located in a particular subregion in a particular subdivision, then it must be the case that there will be no training points within any subregions contained within that particular subregion (which are analysed at finer levels of resolution for further subdivisions). It is therefore possible when dealing with such later subdivisions to skip entirely the subregions within a bigger subregion already known to be devoid of training points. This leads to further benefit in processing time and storage space.

The benefits mentioned above with reference to FIG. 6 are explored further in the description relating to the second embodiment below in which a "sparse grid" storage system is employed.

Figure 7:
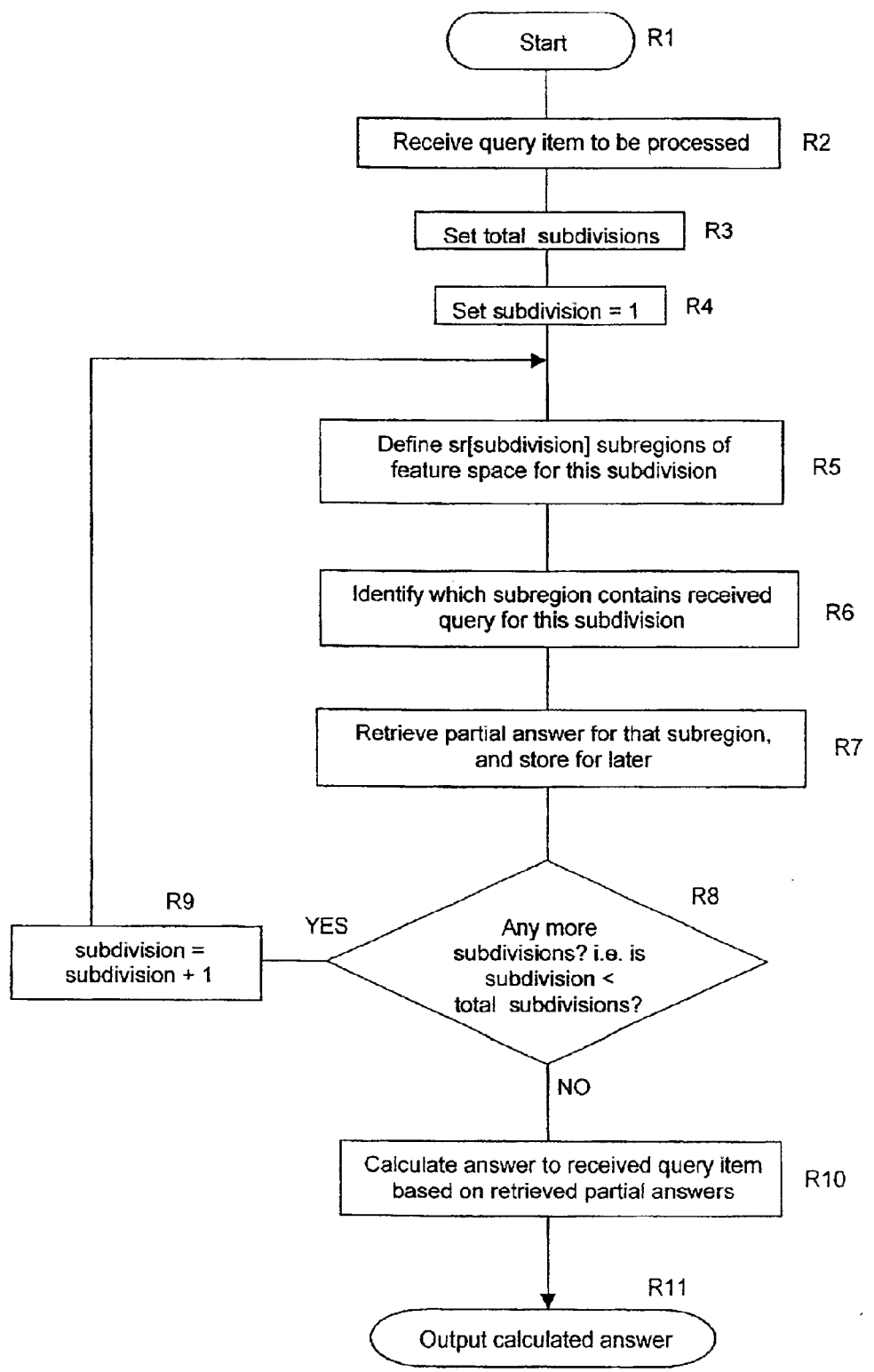
FIG. 7 is a flowchart illustrating the steps performed by data processing apparatus embodying the present invention.

FIG. 7 is a flowchart which summarizes the steps mentioned above to perform the evaluation phase of a learning machine for the evaluation of the value of the decision function, as set up by a previous training phase, for an arbitrary new query item. The training phase will have enabled the setting up of a store of precalculated partial answers for at least some of the subregions defined in the training phase as mentioned above. In evaluation phase (data processing method) embodying the present invention, answers are evaluated for respective received new query items. Each new query item is considered to be represented by a point within the region of feature space of the training phase described above.

The method begins at step R1. In step R2 a new query item is received that is to be processed to produce an answer based on the query item and the store of precalculated partial answers. In step R3 the total number of subdivisions "total_subdivisions" is to the same value used in the training phase. In step R4, a counter "subdivision" is set to the value 1, signifying that processing will start with subdivision "1".

In step R5 the same set of subregions for this subdivision is defined as were used in the training phase. The number of subregions depends upon the subdivision, or level of resolution, being processed at the time. This number can be accessed from a store represented here by an array "sr[i]", where "i" is the subdivision concerned. In step R6 it is determined in which of the subregions defined in step R5 for the present subdivision the received query item is located. In step R7, the partial answer for the subregion identified in step R6 is retrieved from the above-mentioned store of precalculated partial answers set up by the training phase. This partial answer is stored temporarily for later use in a step R10.

In step R8 it is determined whether there are any more subdivisions, or levels of resolution, to process. This is done by determining whether "subdivision" is less than "total_subdivision". If so, then there are further subdivisions to process; in this case the value of "subdivision" is incremented in step R9 and another subdivision is analysed by returning processing to step R5. If "subdivision" is determined in step R8 not to be less than "total_subdivision", then there are no more subdivisions, or levels of resolution, to process, and processing continues to step R10. In step R10 the answer to the received query item is calculated based on the partial answers retrieved at each subdivision in step R7, and this answer is outputted in the final step R11.

As part of the evaluation process described above, it is stated that in step R5 a number subregions of the region of feature space is defined, for each subdivision (or level of resolution). It will be appreciated that this is a notional step and need not be carried out as a separate physical step. All that is necessary is that the subregions are somehow defined in advance of steps R6 and R7 so that it can be determined in which subregion the received query item is located. Also, if for example a sparse representation of the subregions is used (see above) then it is also not necessary that all of the subregions in a particular subdivision are defined, only those that are represented in the previously-stored training information.

Figure 8:
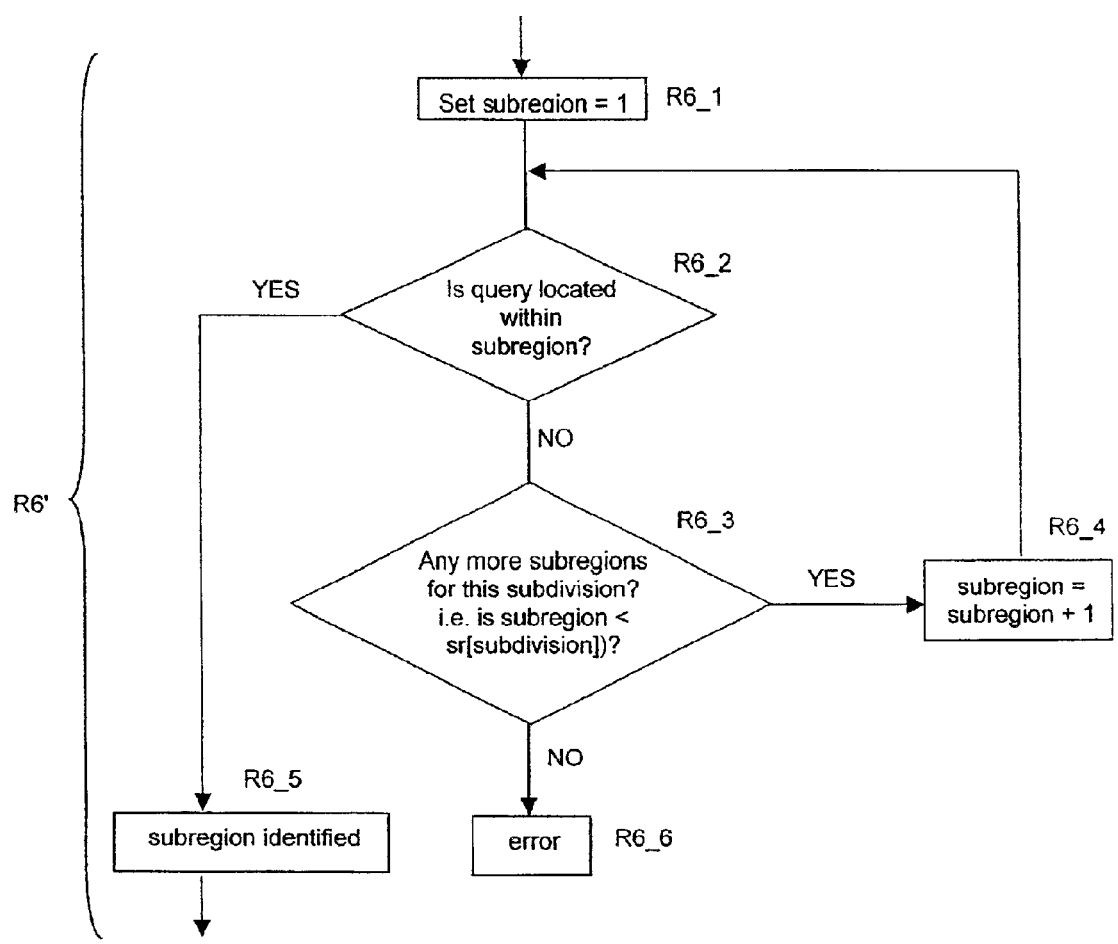
FIG. 8 is a flowchart illustrating in more detail one way of carrying out step R6 of FIG. 7.

FIG. 8 is a flowchart illustrating in more detail one way of carrying out step R6 of FIG. 7 (identifying which subregion contains the received query item for the subdivision being processed). Step R6' in FIG. 8 corresponds to step R6 in FIG. 7 and is formed of a combination of steps R6_1 to R6_6.

In step R6_1 a counter "subregion" is set to the value 1 and processing continues to step R6_2. In step R6_2 it is determined whether the received query item is located in the subregion identified by the counter "subregion" (the subregions for the subdivision being processed have already been defined in step R5 of FIG. 7). If the received query item is located in the subregion being analysed, then in step R6_5 this subregion is identified as the one which contains the query item and processing returns to step R7 in FIG. 7. If it is determined instead in step R6_2 that the query item is not located in the subregion being analysed, then it is determined in step R6_3 whether there are any more subregions to be processed for the subdivision, or level of resolution, concerned. This is done by determining whether "subregion" is less than "sr[subdivision]" (see step R5 in FIG. 7). If so, then there are further subregions for this subdivision; in this case the value of "subregion" is incremented in step R6_4 to move processing to the next subregion, and processing is returned to step R6_2. If "subregion" is determined in step R6_3 not to be less than "sr[subdivision]", then there are no more subregions for this subdivision and processing continues to step R6_6. If processing has reached step R6_6 then an error has occurred because the subregions are defined in step R5 in FIG. 7 such that there should be one subregion in each subdivision which contains the received query item.

Other ways of identifying which subregion contains the received query item (step R6) will depend on how the learning machine is implemented and how the subregions are defined in step R5. For example, in a one-dimensional case, if the domain [0,1] is divided into 100 equal intervals, it is clear that the value 0.575 belongs to interval no. 58, and it is not necessary in such a case to check all the intervals in a loop such as that described with reference to FIG. 8.

Figure 9:
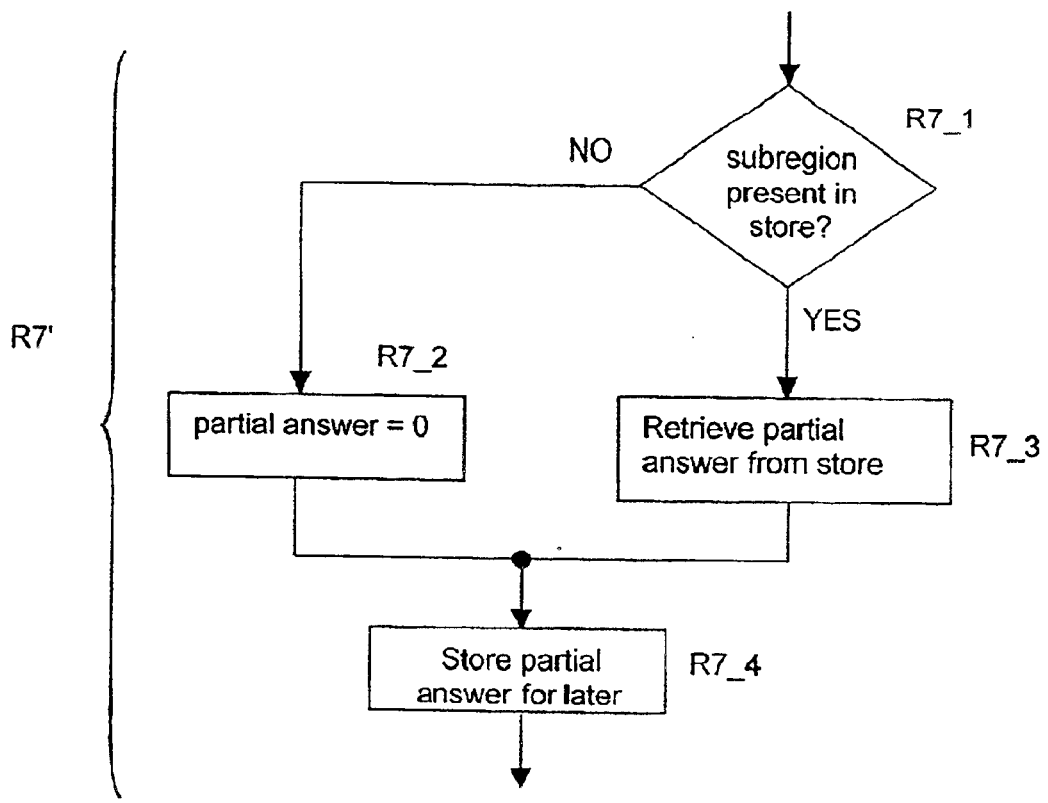
FIG. 9 is a flowchart illustrating in more detail one way of carrying out step R7 of FIG. 7.

FIG. 9 is a flowchart illustrating in more detail one way of carrying out step R7 of FIG. 7 (retrieving the partial answer for the subregion identified in step R6). Step R7' in FIG. 9 corresponds to step R7 in FIG. 7 and is formed of a combination of steps R7_1, R7_2, R7_3 and R7_4. Step R7' can be used when the apparatus used for the corresponding training phase made use of a "sparse" storage scheme as described above with reference to optional step S6''' of FIG. 6. If such a sparse storage scheme is used, then it is possible that there is no partial answer present in the store of partial answers for a particular subregion accessed in step R7 of FIG. 7. This would be the case if there had been no training query items located within that subregion present in the training set used for the training phase. Therefore, in step R7' of FIG. 9 it is first determined in step R7_1 whether there is anything present in the store of partial answers for the subregion identified in step R6 of FIG. 7. If so, then the stored partial answer is retrieved in step R7_3, otherwise the partial answer is assumed in step R7_2 to be zero. The partial answer so determined is stored for later use in accordance with step R7 of FIG. 7 and processing then passes back to step R8 of FIG. 7.

Figure 10:
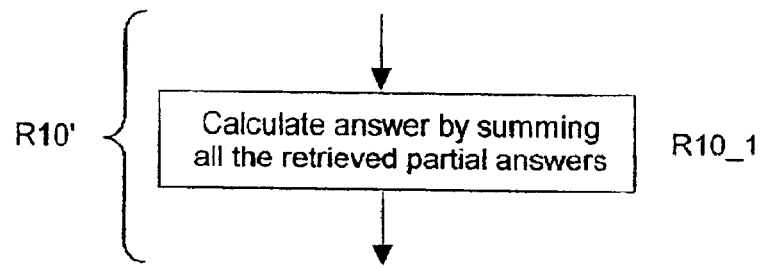
FIG. 10 is a flowchart illustrating in more detail one way of carrying out step R10 of FIG. 7.

FIG. 10 is a flowchart illustrating in more detail one way of carrying out step R10 of FIG. 7 (calculating the answer to the received query item based on the partial answers retrieved in step R7). Step R10' in FIG. 10 corresponds to step R10 in FIG. 7 and is formed of a single step R10_1. In step R10_1, the answer is calculated by summing all of the retrieved partial answers from step R7. This answer so calculated is then output in step R11 of FIG. 7. It will be appreciated that step R10' could alternatively be used in place of step R7 so that a cumulative sum of partial answers could be calculated during the iterative process without having to store the retrieve partial answers for a separate summation later.

Figure 11:
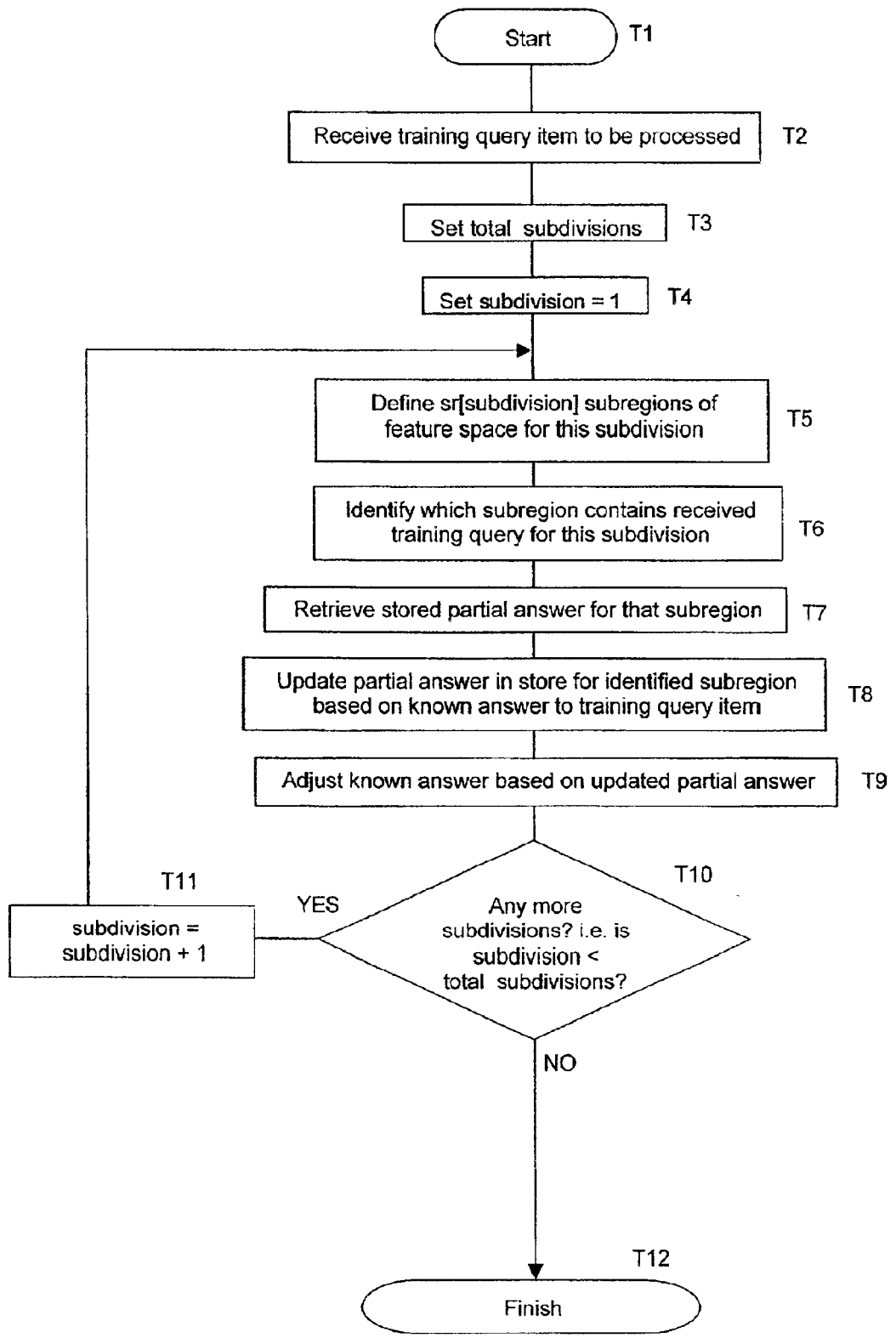
FIG. 11 is a flowchart illustrating the steps performed by data updating apparatus embodying the present invention.

FIG. 11 is a flowchart which summarizes the steps mentioned above to perform the updating of a decision function set up by a previous training phase whenever a new training point is available. The training phase will have enabled the setting up of a store of precalculated partial answers for at least some of the subregions defined in the training phase as mentioned above. In such a data updating method embodying the present invention, new training query items and respective known answers are analysed so as to update the precalculated answers according to the new query items. The new training query items are considered to be represented by respective training points within a region of feature space as mentioned above.

The method begins at step T1. In step T2 a new training query item is received that is to be analysed so as update the store of precalculated partial answers. In step T3 the total number of subdivisions "total_subdivisions" is to the same value used in the training phase. In step T4, a counter "subdivision" is set to the value 1, signifying that processing will start with subdivision "1".

In step T5 the same set of subregions for this subdivision is defined as were used in the training phase. The number of subregions depends upon the subdivision, or level of resolution, being processed at the time. This number can be accessed from a store represented here by an array "sr[i]", where "i" is the subdivision concerned. In step T6 it is determined in which of the subregions defined in step T5 for the present subdivision the received training query item is located. In step T7, the partial answer for the subregion identified in step T6 is retrieved from the above-mentioned store of precalculated partial answers set up by the training phase. This partial answer is updated in step T8 based on the retrieved partial answer and the known answer to the training query item. In step T9 the known answer to the training query item is updated in dependence upon the updated partial answer determined in step T8 for use in the subsequent iteration, if any. This updated answer is an example of a 'residual' mentioned above.

In step T10 it is determined whether there are any more subdivisions, or levels of resolution, to process. This is done by determining whether "subdivision" is less than "total_subdivision". If so, then there are further subdivisions to process; in this case the value of "subdivision" is incremented in step T11 and another subdivision is analysed by returning processing to step T5. If "subdivision" is determined in step T10 not to be less than "total_subdivision", then there are no more subdivisions, or levels of resolution, to process, and processing continues to step T12, where the updating process is complete.

As part of the updating process described above, it is stated that in step T5 a number subregions of the region of feature space is defined, for each subdivision (or level of resolution). It will be appreciated that this is a notional step and need not be carried out as a separate physical step. All that is necessary is that the subregions are somehow defined in advance of steps T6 to T9 it can be determined in which subregion the received training query item is located. Also, if for example a sparse representation of the subregions is used (see above) then it is also not necessary that all of the subregions in a particular subdivision are defined, only those that are represented in the previously-stored training information.

One way of implementing step T6 of FIG. 11 is to use a method equivalent to that described above with reference to FIG. 8 (step R6'). One way of implementing step T9 of FIG. 11 is to use a method described above with reference to FIG. 4 (step S7').

Figure 12:
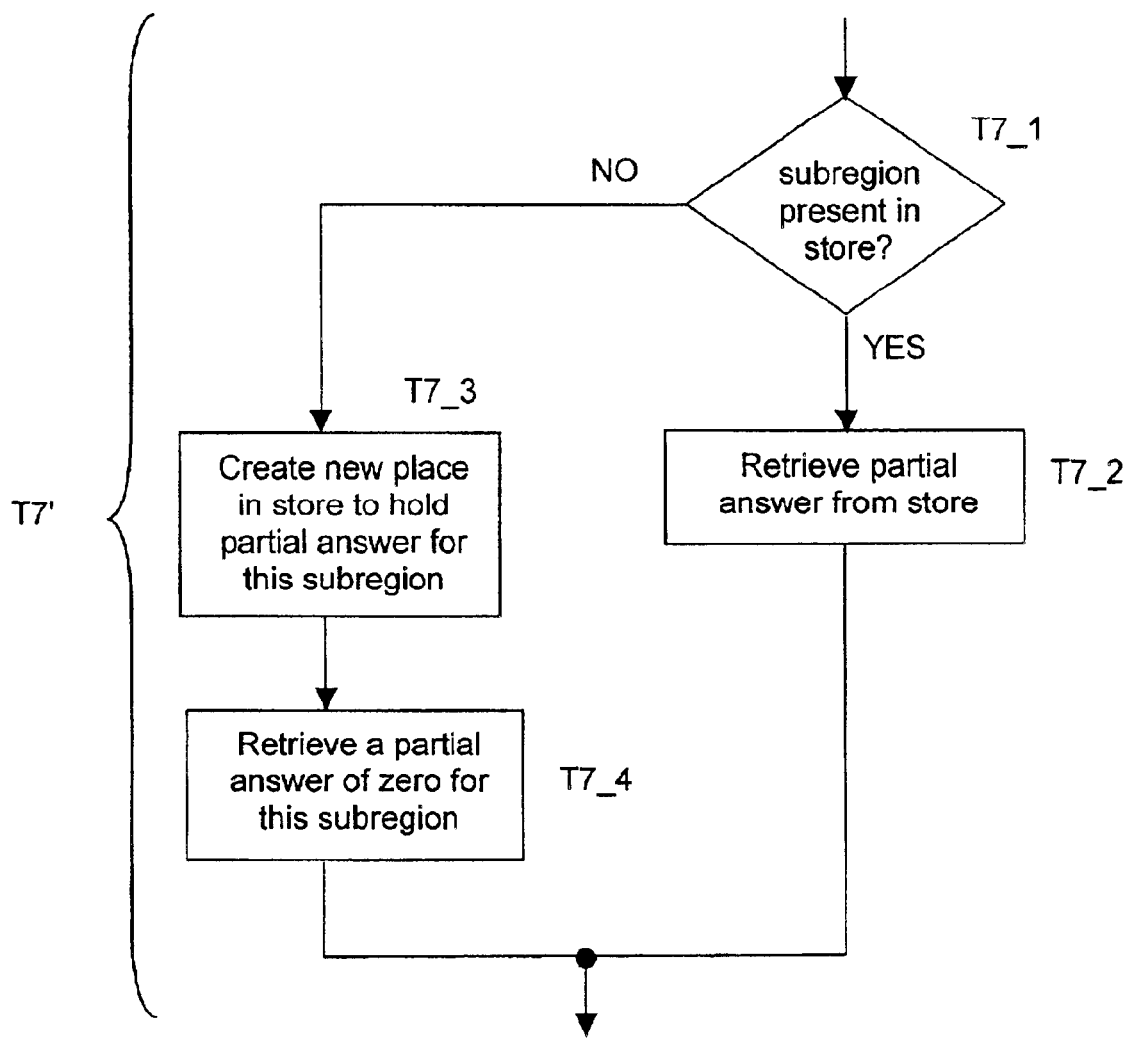
FIG. 12 is a flowchart illustrating in more detail one way of carrying out step T7 of FIG. 11.

FIG. 12 is a flowchart illustrating in more detail one way of carrying out step T7 of FIG. 11 (retrieving stored partial answer for the subregion identified in T6). Step T7' in FIG. 12 corresponds to step T7 in FIG. 11 and is formed of a combination of steps T7_1 to T7_4. In a similar way to the description above with reference to FIG. 9, Step T7' can be used when the apparatus used for the previous training phase made use of a "sparse" storage scheme as described above with reference to optional step S6''' of FIG. 6. If such a sparse storage scheme is used, then it is possible that there is no partial answer present in the store of partial answers for a particular subregion accessed in step T7 of FIG. 11. This would be the case if there had been no training query items located within that subregion present in the training set used for the training phase. Therefore, in step T7' of FIG. 12 it is first determined in step T7_1 whether there is anything present in the store of partial answers for the subregion identified in step T6 of FIG. 11. If so, then the stored partial answer is retrieved in step T7_2. If not, then the subregion must be represented in the store in future since the new training query item is located in the subregion, and therefore in step T7_3 a new place is created in the store to hold the partial answer for this subregion. For the present iteration it is assumed in step T7_4 that the partial answer is zero. Processing then passes back to step T8 of FIG. 11.

Figure 13:
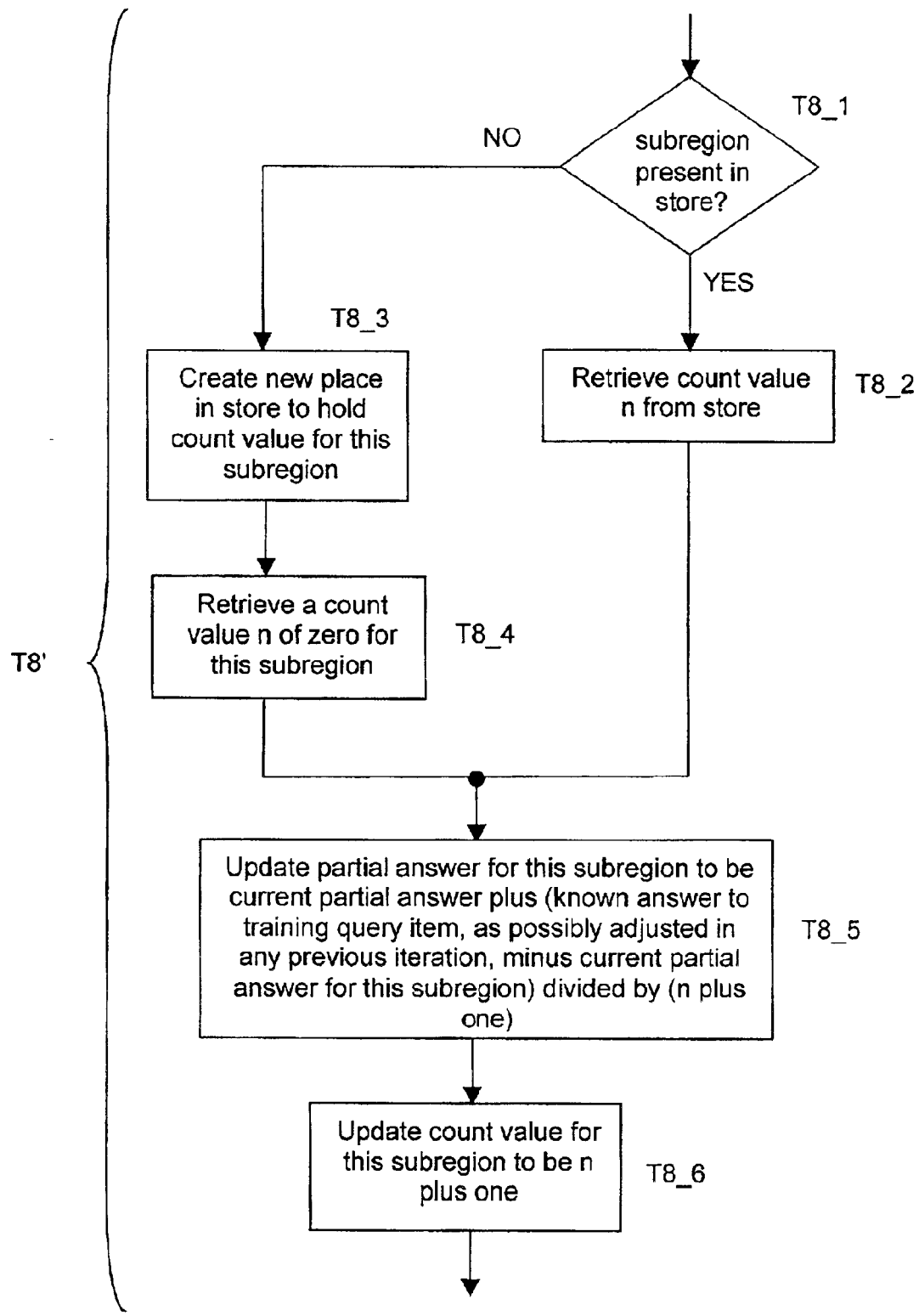
FIG. 13 is a flowchart illustrating in more detail one way of carrying out step T8 of FIG. 11.

A preferred way of implementing step T8 of FIG. 11 (updating partial answer for subregion identified in step T6) will now be described with reference to FIG. 13. Step T8' in FIG. 13 corresponds to step T8 in FIG. 11 and is formed of a combination of steps T8_1 to T8_6. The use of such a step T8' presupposes that in the previous training phase described above with reference to FIG. 2 the step S6''' described with reference to FIG. 6 was used. In such a training phase a store is maintained of the number of training query items located within each subregion (the count value for that subregion), preferably stored in a sparse storage system. These count values are used in step T8' of FIG. 13.

If such a sparse storage scheme is used, then it is possible that there is no count value present in the store of count values for a particular subregion identified in step T6 of FIG. 11. This would be the case if there had been no training query items located within that subregion present in the training set used for the training phase. Therefore, in step T8' of FIG. 13 it is first determined in step T8_1 whether there is anything present in the store of count values for the subregion identified in step T6 of FIG. 11. If so, then the stored count value n is retrieved in step T8_2 and processing continues to step T8_5. If not, then the subregion must be represented in the store in future since the new training query item is located in the subregion, and therefore in step T8_3 a new place is created in the store to hold the count value for this subregion. For the present iteration it is assumed in step T8_4 that the count value n is zero and processing then continues to step T8_5. In steps T8_5 and T8_6 the partial answer and the count value respectively for the subregion are updated using the updating formulae (1) and (2) presented above.

Although the updating procedure presented above with reference to FIG. 11 has been described as being used to update previously-trained learning apparatus based on new training data, it will be appreciated that the updating procedure can also be used to train learning apparatus from scratch. In such a case the initial state of the apparatus would be to have the partial answers and count values for every subregion initialised to zero. Training query items would then be presented one-by-one to update the partial answers and count values according to whichever subregion the training query item is located. This would be a so-called "on-line" version of the training algorithm, whereas the training algorithm described with reference to FIG. 2 is the "batch" version.

Figure 14:
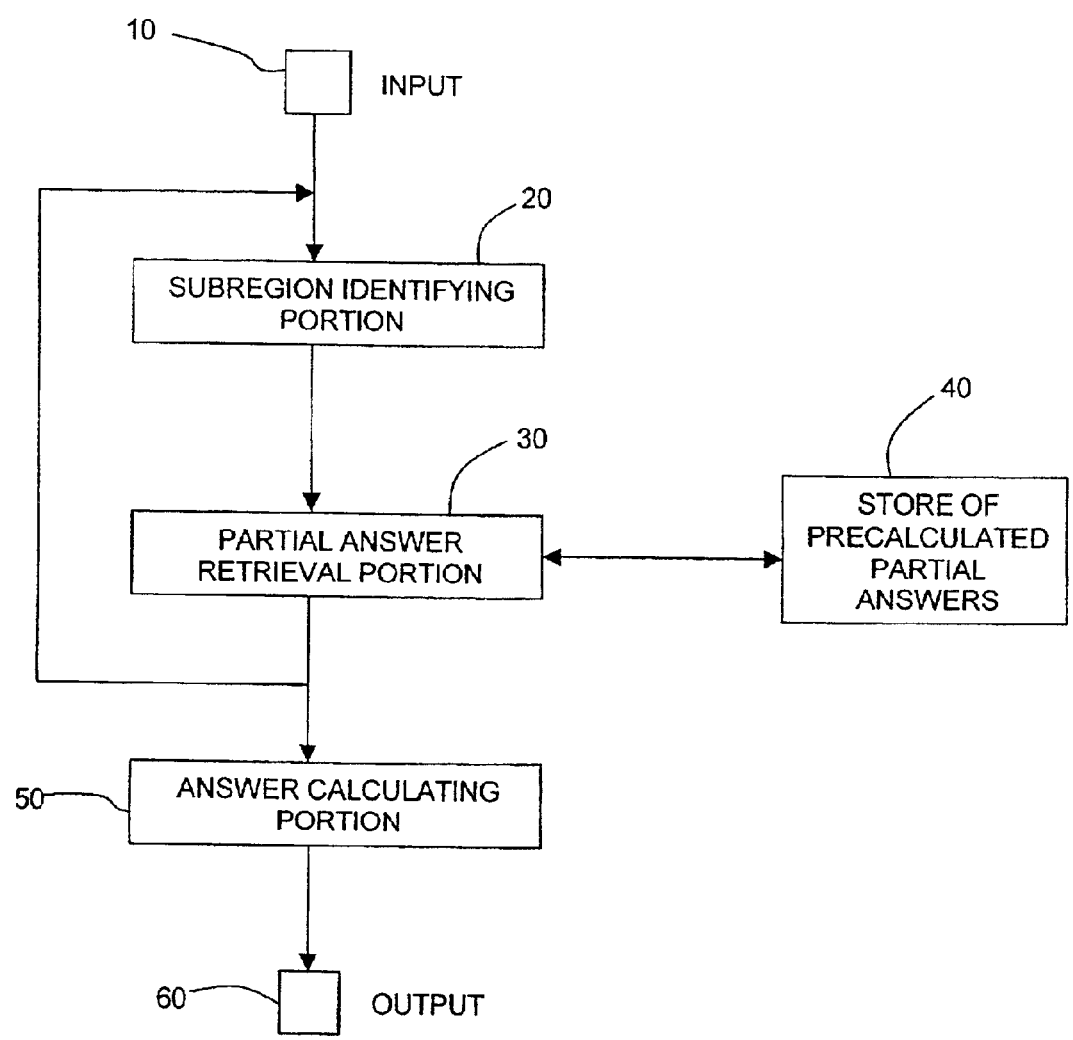
FIG. 14 is a block diagram showing parts of data processing apparatus embodying the present invention.

FIG. 14 is a block diagram showing parts of data processing apparatus embodying the present invention. The data processing apparatus of FIG. 14 is for use in carrying out the steps described above with reference to FIG. 7, and comprises an input 10, a subregion identifying portion 20, a partial answer retrieval portion 30, a store 40 of precalculated answers, an answer calculating portion 50 and an output 60. The input is for receiving a query item to be processed (equivalent to step R2 of FIG. 7). The subregion identifying portion 20 carries out step R6 of FIG. 7. The partial answer retrieval portion 30 carries out step R7 of FIG. 7 with access to the store 40 of precalculated answers. The answer calculating portion 50 carries out step R10 of FIG. 7. The calculated answer is output to the output 60 (equivalent to step R11 of FIG. 7).

Figure 15:
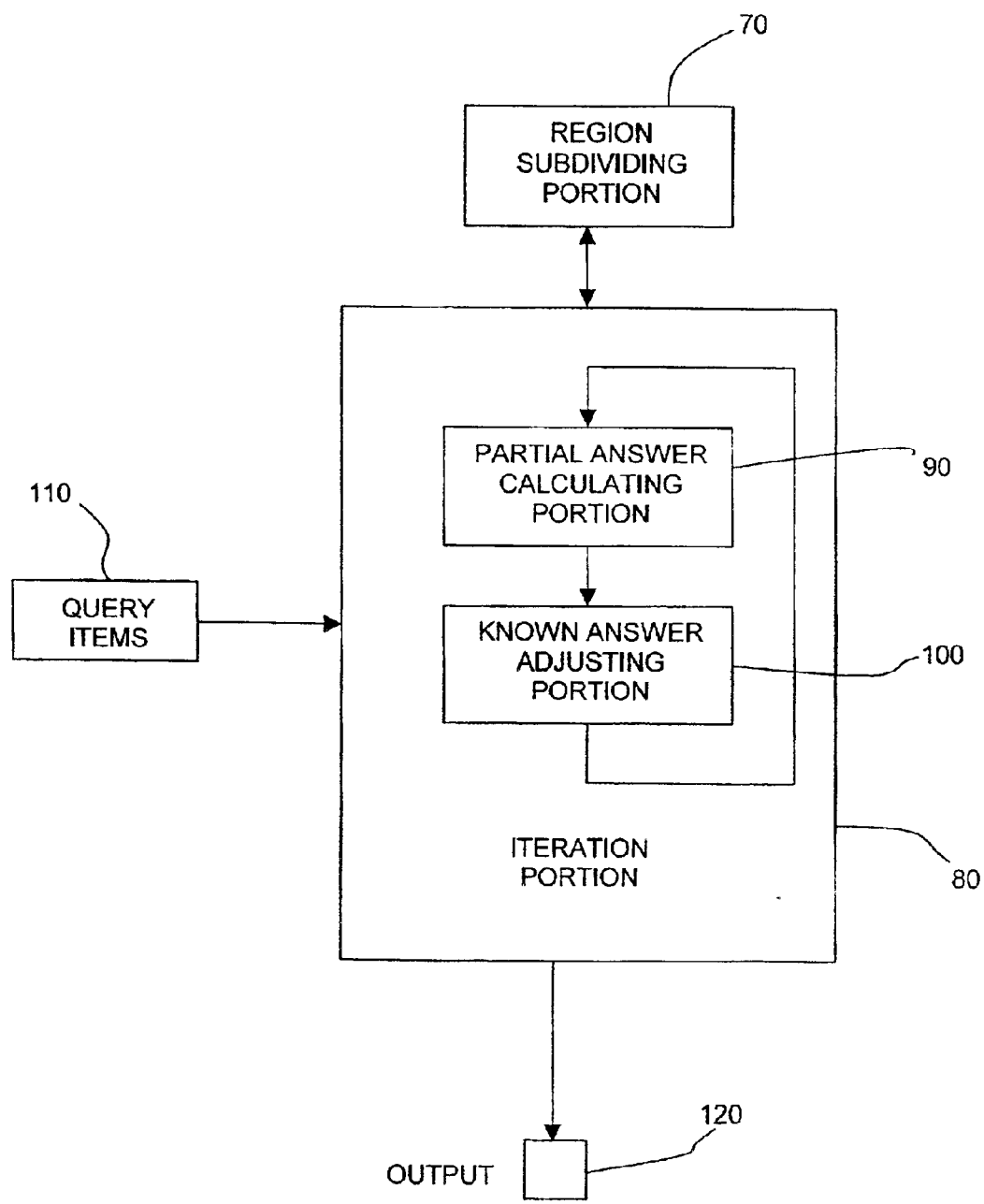
FIG. 15 is a block diagram showing parts of data training apparatus embodying the present invention.

FIG. 15 is a block diagram showing parts of data training apparatus embodying the present invention. The data training apparatus of FIG. 15 is for use in carrying out the steps described above with reference to FIG. 1, and comprises a region subdividing portion 70, an iteration portion 80, a set of query items 110, and an output 120. The iteration portion 80 comprises a partial answer calculating portion 90 and a known answer adjusting portion 100. The region subdividing portion 70 carries out step S4 of FIG. 1. The partial answer calculating portion 90 carries out step S6 of FIG. 1. The known answer adjusting portion 100 carries out step S7 of FIG. 1. The iteration portion 80 controls the processing in the partial answer calculating portion 90 and the known answer adjusting portion 100 (equivalent, for example, to steps S8 and S10 in FIG. 2) with access to the set of query items 110 which form the training set. The partial answers are output to the output 120 (equivalent to step S12 in FIG. 2).

Figure 16:
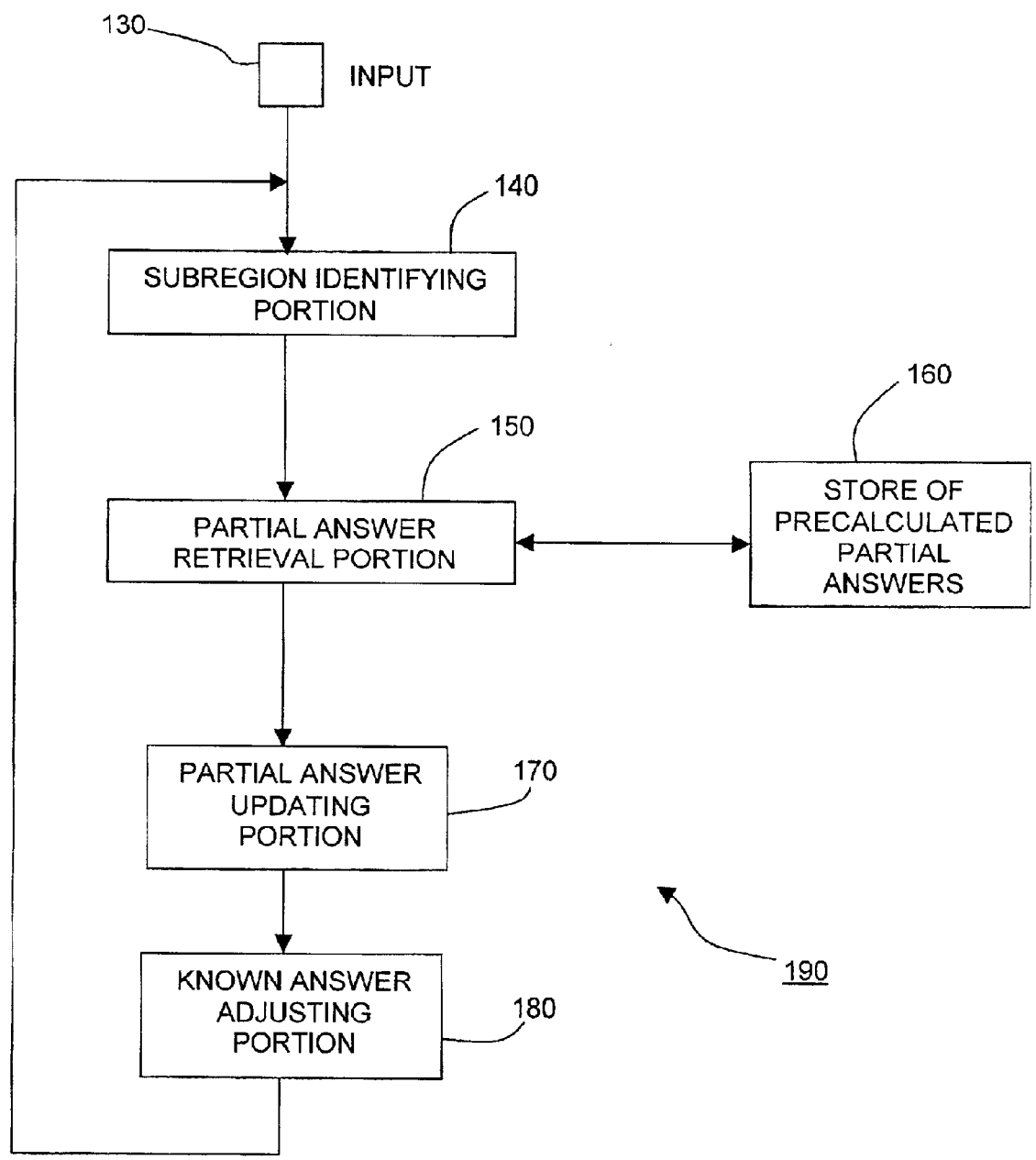
FIG. 16 is a block diagram showing parts of data updating apparatus embodying the present invention.

FIG. 16 is a block diagram showing parts of data updating apparatus embodying the present invention. The data updating apparatus of FIG. 16 is for use in carrying out the steps described above with reference to FIG. 11, and comprises an input 130, a subregion identifying portion 140, a partial answer retrieval portion 150, a store 160 of precalculated partial answers, a partial answer updating portion 170 and a known answer adjusting portion 180. A new training query item is received at the input 130 (equivalent to step T2 in FIG. 11). The subregion identifying portion 140 carries out step T6 of FIG. 11. The partial answer retrieval portion 150 carries out step T7 of FIG. 11 with access to the store 160 of precalculated partial answers. The partial answer updating portion 170 carries out step T8 of FIG. 11. The known answer adjusting portion 180 carries out step T9 of FIG. 11. At least the partial answer updating portion 170 and the known answer adjusting portion 180 can be considered to be part of an iteration portion 190 which controls operation of those parts (equivalent, for example, to step T10 of FIG. 11).

Apparatus of FIGS. 14 to 16 can be implemented by a general-purpose computer operating according to a program, or by dedicated hardware provided specifically for this purpose. Although the program can conveniently be stored on a computer-readable medium, it will be appreciated that a computer program embodying the present invention need not be stored on a computer-readable medium and could, for example, be embodied in a signal such as a downloadable data signal provided from an Internet website. The appended claims are to be interpreted as covering a computer program by itself, or as a record on a carrier, or as a signal, or in any other form.

Further optional extensions to the invention are as follows.

The decision function can be constructed to be continuous and even smooth. One way to do this is to modify the procedure of update of the decision function. New training points updates the coefficients $a_{lj}$ of the regions that contain the new training point and of the neighbor regions. The magnitude of the update depends on the residual value of the training point and on the distance between the training point and the regions.

Another way to do this is to modify the procedure of evaluation of the decision function. The decision function evaluated in point $f$ by summing $w_{flj} \cdot a_{lj}$, where $a_{lj}$ of the regions that contain the query point and also of the neighbor regions. The weights $w_{flj}$ depend on the distance between the query point and the regions.

There will now be discussed some of the advantages of the disclosed invention over the prior art learning machines.

Learning time: The prior art learning machines typically have learning time $O(|T|^2)$, where $|T|$ is the size of the training set. Moreover, in order to process a new training sample the prior learning machines have to revise all the previous training samples. This complicates the on-line learning and forces one to memorize and store all the previous training samples in order to be able to process the new samples.

Here, the decision function is updated by each new training point by simply updating one decomposition coefficient at each resolution level l, l=0, ..., L. The number of resolution levels L<10 in most practical cases. Thus in order to process a new training sample it is necessary to make only a few tens of processor operations. A new training sample can be included into D anytime. Thus D enables very efficient on-line learning.

Query time: Prior art learning machines usually perform many computations in order to provide an answer to a query. For example in a neural network the non-linear functions must be evaluated at every node of the network, the output of every layer must be multiplied by a connection matrix and other complex computations must be performed. With Nearest Neighbor classifiers the distance form the query to every training sample that has ever been learned must be calculated.

Here, in order to evaluate the decision function D at an arbitrary point $f$ it is necessary only to sum the decomposition coefficients $a_{lj}$ at every resolution level l=0, ... L, where L<10 in most practical cases. Thus, D can be evaluated at an arbitrary point with just a few tens of processor operations.

Memory requirement: Some prior art learning machines, such as Neural Networks, have a fixed number of adapting parameters. For the learning problems that are too simple they waste more memory than required by a problem and lack generalization. For the learning problems that are too complicated they suffer from underfitting and suboptimal classification performance.

The prior art learning machines such as Nearest Neighbor Classifiers store all the samples from the training set, what requires unduly large memory for large training sets and makes these machines slow at the phase of answering to a query.

Here, the decision function stores only two numbers $a_{lj}$ and $n_{lj}$ for each cell that contains at least one training point and does not spend memory at all for the cells that do not contain training points. Therefore, the decision function uses but a few bytes to store an arbitrary large training set in cases such as in the example below. Furthermore, it will store an arbitrarily complicated training set with but a slight loss of information.

For example for a training set of arbitrarily huge size n that consists of $n_A$ points of class A=1 and $n_B=n-n_A$ points of class B=−1 that fall into two different cells$_{lj_1}$ and$_{lj_2}$ at resolution level 1, the decision function will store only 6 numbers: $n_0=n$, $$a_0 = \frac{(1 \cdot n_A - 1 \cdot n_B)}{n},$$

$n_{lj_1}=n_A$, $a_{lj_1}=1-a_0$, $n_{lj_2}=n_B$, $a_{lj_2}=-1-a_0$. However all the necessary information about the training set is stored and any query from the same classes will be classified correctly.

Local minima problems: Local minima is one of the hard problems of prior art learning machines, based on differential optimizers. It consists in convergence of the optimization procedure to a solution that is suboptimal, even if superior to any other solution in the nearest vicinity.

Here, the decision function is constructed in a deterministic way to be the best approximation to the training set in the predefined arbitrarily dense space of functions. Therefore D is globally optimum by construction.

Soft classification decision: It is often necessary to obtain the soft classification decision that indicates the probability of each class. Prior art learning machines such as Support Vector Machines or Nearest Neighbor Classifiers capable to provide only binary 'Yes/No' classification decision. Prior art learning machines such as Neural Networks are theoretically able to provide the soft classification decision, however the provided decision has no solid justification and is practically useless.

Here, the decision function is naturally constructed do obtain the values inside, say, [−1,1] to indicate the probability of each class. The value of D($f$) is built upon number of the samples of each class inside the cells that contain $f$ and therefore indicates the probability of each class and has the solid justification. Furthermore, number of points inside these cells, $n_{lj}$, show the number of samples that contributed to D($f$) and can be used to estimate the confidence level of the soft decision.

Applications of this invention include, but not limited by: Business: Marketing, Real Estate; Document and Form Processing: Machine Printed Character Recognition, Graphics Recognition, Hand Printed Character Recognition, Cursive Handwriting Character Recognition, Food Industry: Odor/Aroma Analysis, Product Development, Quality Assurance; Financial Industry: Market Trading, Fraud Detection, Credit Rating; Energy Industry: Electrical Load Forecasting, Hydroelectric Dam Operation; Manufacturing: Process Control, Quality Control; Medical and Health Care Industry: Image Analysis, Drug Development, Resource Allocation; Science and Engineering: Chemical Engineering, Electrical Engineering, Weather; Transportation and Communication: Transportation, Communication. Various new applications of this invention may emerge with the advances of technology.

The following are also seen as advantages or applications of the present invention:

1. Implementation of a learning machine as a function, deterministically constructed on the basis of the training set.
2. Compact representation of the decision function.
3. Sparse representation of the decision function.
4. Multi-resolution representation of the decision function.
5. Hierarchical representation of the decision function.
6. Representation of the decision function with the coefficients.
7. Calculating of the value of the decision function in the test point with the use of the coefficients.
8. Update of the decomposition coefficients with the use of the value of the single training point or training points.
9. Each of the presented algorithms as a whole or each step alone, their philosophy.
10. The method of fast construction of the function on the basis of partial information about this function.
11. Use of the decision function for Image binarization.

In summary, in the first embodiment we propose a new method of computer learning based on a deterministic construction of a decision function using a training set. A decision function D is a law that for each point $f$ from an input space F, $F \subset R^n$, gives a corresponding value g in an output space G, $G \subset R^m$: $g=D(f)$, $\{f \in F, g \in G\}$. A training set T is the set of points in the product space F×G: $T=\{f_i,g_i\}$ where $f_i \in F, g_i \in G$.

2. Second Embodiment

For the second preferred embodiment the classification problem will be defined as the problem of providing an answer y, associated with an arbitrary query $\vec{x}$ on the basis of a given training set T. The training set consists of ordered pairs of queries and answers, $$T=\{\vec{x}_i,y_i\}_{i=1}^M \qquad (3)$$

Any query belongs to the space of queries or feature space F: $\vec{x} \in F$, and any answer belongs to the space of answers or class assignment space Y: $y \in Y$. Obviously $T \in F \times Y$. An ordered pair $\{\vec{x}_i,y_i\} \in T$ will be referred to as a training point.

This embodiment considers classification problems with continuous feature spaces, prescaled into a D dimensional unit cube: $\vec{x} \in F=[0,1]^D$. The classification decision y obtains values in the interval [−1,1].

The classification problem can be considered as the reconstruction problem of some unknown function $f(\vec{x})$ that interpolates or approximates the points of the training set $T=\{\vec{x}_i,y_i\}_{i=1}^M$, $$f:F \Rightarrow Y$$

$$f(\vec{x}_i) \approx y_i, \forall i \in \{1, \ldots, M\}. \qquad (4)$$

This problem is usually referred to as an ill-posed problem (for further details of which, see: "Regularization networks and support vector machines" by Evgeniou, Pontil and Poggio (Advances in Computational Mathematics 13(1), pp. 1–50, 2000); "Statistical Learning Theory" by Vapnik (John Wiley and Sons, 1998); "Data mining with sparse grids" by Garcke, Griebel and Thess (http://citeseer.nj.nec.com/3888914.html, 2000); and "Wavelets and ill posed problems: optic flow and scattered data interpolation" by Bernard (PhD. Thesis, 1999), the entire contents of which are herein incorporated by reference). In fact, there are infinitely many functions that interpolate the points of the training set and yet have different values at the other points. It is usually proposed to use regularization theory (see "Solutions of ill-Posed Problems" by Tikhonov and Arsenin (V. H. Winston & Sons, J. Wiley & Sons, Washington D.C., 1977), the entire content of which is herein incorporated by reference) in order to overcome this difficulty, and to convert the problem into the well posed one of minimizing of the functional, $$H(f) = \sum_{i=1}^{M} (f(\vec{x}_i) - y_i)^2 + \lambda \Phi(f). \qquad (5)$$

The first term in this functional is responsible for approximating the training set, while the second is the regularization term, favoring smoothness and 'simplicity' off the function $f$. The function $f$ belongs to some pre-defined parametric family $f(\vec{x}) = f(\vec{a}_0, \vec{x}) \in \{f(\vec{a}, \vec{x})\}$. This problem is usually solved by minimization of $H(f)$ in the space of $\vec{a}$. Both Neural Networks (see "Regularization theory and neural networks architectures" by Girosi, Jones and Poggio (Neural Computation, 7:219–269, 1995), the entire content of which is herein incorporated by reference) and Support Vector Machines (see references mentioned above to Evgeniou et al, and Vapnik) are examples of such approaches. These methods were proved to be efficient by many successful applications. However, they suffer from some limitations:

a) The search for optimal parameters $\vec{a}$ that minimize the function(5), usually requires $O(M^2)$ operations for a training set of size $|T|=M$ (see "Making large-scale SVM learning practical" by Joachims (Advances in Kernel Methods: Support Vector Machines, MIT Press, Cambridge, Mass., 1998), the entire content of which is herein incorporated by reference).

b) Every training point is processed several (usually $O(M)$) times during the training phase. Therefore, all the training points have to be stored until the end of the training, which is expensive for the large training sets.

c) The class of functions $f(\vec{a})$ is often either too limited or too large for the training set, which leads to suboptimal performances of the classifier.

The reconstruction of an unknown function from the information in the training set (4) can be converted into a well posed problem by limiting the class of approximating functions. Let us consider the function $f$, defined in some basis $\{\phi_l(\vec{x})\}_{l=1}^{\infty}$ of $L^2(F)$, $$f = \sum_{i=1}^{\infty} c_i \phi_i(\vec{x}). \qquad (6)$$

If the coefficients $c_l$ can be uniquely determined from the training set $c_l = c_l(T)$, for an arbitrary training set, then the learning problem (4) becomes 'well posed'. One can consider the regularization as a property of the basis and the procedure of calculating $c_l$.

We propose an approximation framework for the classification problem, in which the unknown function $f$ is constructed as a set of coefficients in a given basis (6). The coefficients $c_l$ are uniquely defined by the training set and are computed by a simple algebraic algorithm. This allows a fast construction of $f$ in $t=O(M)$ operations and efficient query in constant time. The memory required for the storage of $f$ is $O(M)$ in the worst case, but usually much smaller. The chosen set of functions $\phi_l(\vec{x})$ can successfully learn and approximate a data set of arbitrary complexity, provided it has low dimensionality.

For a dense sampling of a D dimensional feature space $F \subset R^D$, a training set of size $M >> 2^D$ is required. For the cases where $M < \sim 2^D$, a modification of the basic algorithm improves the classification performances for sparse datasets, at the expense of the query time.

There are two frameworks that motivated our approach: firstly Bernard (see above for reference details) developed the wavelet approach for multiresolution interpolation in high-dimensional spaces for machine learning applications (see also "A Wavelet Tour of Signal Processing" by Mallat (pp.221–224, Academic Press, 1999), the entire content of which is herein incorporated by reference); and secondly Garcke et al. (see above for reference details) presented a sparse grid solution for data mining.

In this embodiment the machine learning problem is considered and treated as an interpolation or approximation of training set points. This approximation is done within the framework of multiresolution analysis, similar to the work by Bernard (see above for reference details). However, the function is constructed in a different way in order to efficiently handle the sparse data, which is a typical case in classification problems. We span the feature space by multiresolution sparse grids as in Garcke et al (see above for reference details), yet instead of a search for optimal coefficients by a minimization process, we determine and update coefficients by direct arithmetic calculations. Thereby, we end up with a shorter training time and smaller memory usage.

The proposed algorithms were used to efficiently construct a two dimensional approximation function of sparse scattered points. The constructed function was used as a threshold surface for image binarization in "Efficient threshold surfaces for image binarization" by Blayvas, Bruckstein and Kimmel (*Computer Vision and Pattern Recognition*, 2001), the entire content of which is herein incorporated by reference.

Let us first define the multi-resolution representation of the function $f$, and then present the algorithm for calculating the coefficients of this representation from the training set. In general, the training set is defined by, $$T = \{\vec{x}_l, y_l\}_{l=1}^{M} \in [0,1]^D \times [-1,1]. \qquad (7)$$

The unknown function is constructed as follows:

$$f = \sum_{l=0}^{\infty} \sum_{j_1,\ldots,j_D=0}^{2^l-1} c_{j_1,\ldots,j_D}^l \phi_{j_1,\ldots,j_D}^l(\vec{x}), \qquad (8)$$

where $$\phi^0(\vec{x}) = \begin{cases} 1 & \text{if } \vec{x} \in ([0,1])^D \\ 0 & \text{if } \vec{x} \notin ([0,1])^D \end{cases} \qquad (9)$$

and $$\phi_{j_1,\ldots,j_D}^l(\vec{x}) = \phi^0(2^l(\vec{x} - \vec{x}_{j_1,\ldots,j_D})). \qquad (10)$$

Equations (8) to (10) define the approximation function in a basis which is a multidimensional generalization of the Haar basis (see the Mallat reference mentioned above), constructed by tensor products of the one-dimensional bases. The Haar basis is in $L^2$. Since an arbitrary finite training set can be interpolated by some function from $L^2$, basis (8) to (10) can interpolate an arbitrary finite training set.

In practice, the sum over $l$ in (8) is truncated at some $l=\text{MaxLev}$ and therefore it spans only a subspace of $L^2$. Such a truncated sum spans the feature space by the cells of size $2^{-\text{MaxLev} \cdot D}$. It will interpolate the training set everywhere except the cells of this size, which contain several training points with different values (an improbable case for reasonable MaxLev and D).

The coefficient $c_{j_1,\ldots,j_D}{}^l$ relates to a cell $C_{j_1,\ldots,j_D}{}^l$ in the feature space. This cell is a unit cube $[0,1]^D$, downscaled to size $(2^{-l})^D$ and shifted to $\vec{x}_{j_1,\ldots,j_D} = 2^{-l}\{j_1,\ldots,j_D\}$ in F, where $j_k \in \{0,1,\ldots,2^l-1\}$ defines a shift along the k-th coordinate. The coefficients $c_{j_1,\ldots,j_D}{}^l$ are determined by averaging all the residuals $y_k^{(l)}$ of the training points in the corresponding cell (i.e. $\vec{x}_k \in C_{j_1,\ldots,j_D}{}^l$). The residuals are the remaining values of the training points after subtracting their approximation at the lower resolution levels.

Following is the procedure for calculating $c_{j_1,\ldots,j_D}{}^l$ (see also FIGS. 2 to 4 and 6):

1. At the first step, all M training points are approximated by their average value, $$c^0 = \frac{1}{M}\sum_{i=1}^{M} y_i.$$

Next, the value of each training point is set to be the difference between its original value and the already interpolated part $$y_i^{(1)} = y_i - c^0.$$

Here, superscript$^{(1)}$ denotes the first order residual, i.e. the remaining part of the training point value, after its approximation by $c^0$ is subtracted off.

2. At the second step, the feature space $F = [0,1]^D$ is divided into $2^D$ cubic cells with edges of size ½. The cells are denoted by $C_{j_1,\ldots,j_D}{}^1$, where the superscript 1 denotes the first resolution level, l=1, and $j_k \in \{0,1\}$ denotes respectively the $\{0,½\}$ position of the cell along the k-th coordinate of F. Some cells may not contain the training points and the value of f in such cells will not be refined.

For each cell which contains some training points $\{\vec{x}_k\}$, their average in that cell is calculated and assigned to be the value of the cell, $$c^1_{j_1,\ldots,j_D} = \frac{1}{K}\sum_{\vec{x}_k \in C^1_{j_1,\ldots,j_D}} y_k^{(1)}.$$

Here $K>0$ is the number of training points inside the cell.

3. All the training points that contributed to the cell $C_{j_1,\ldots,j_D}{}^1$ are updated, $$y_k^{(2)} = y_k^{(1)} - c_{j_1,\ldots,j_D}{}^l.$$

4. Steps 2 and 3 are repeated at the higher resolution levels up to the pre-defined level MaxLev.

Figure 17:
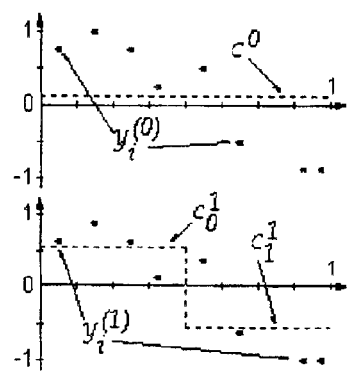
FIG. 17 illustrates the calculation of partial answers and residuals in a training phase for resolution levels 0 and 1 in a one-dimensional case.
Figure 18:
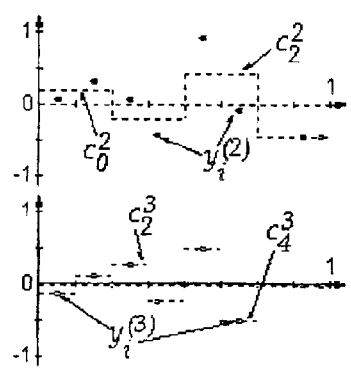
FIG. 18 illustrates the calculation of partial answers and residuals in the same training phase as FIG. 17 for resolution levels 2 and 3.
Figure 19:
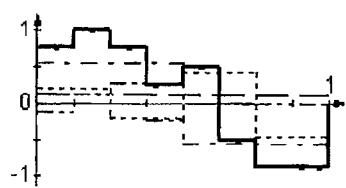
FIG. 19 shown the interpolation achieved after the training phase of FIGS. 17 and 18 for the first four resolution levels.
Figure 20:
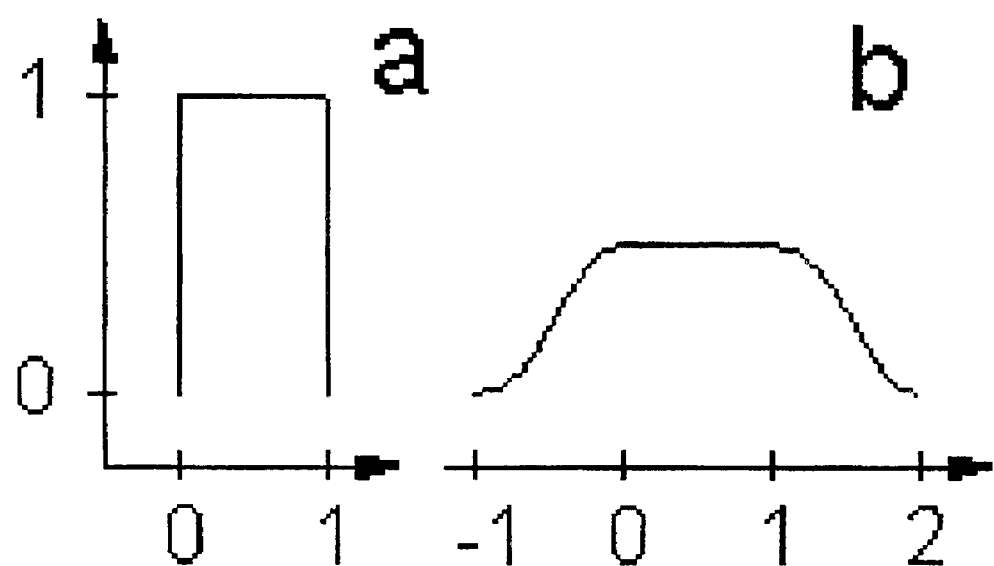
FIG. 20 shows possible source functions for piecewise continuous interpolation and smooth approximation.
Figure 21:
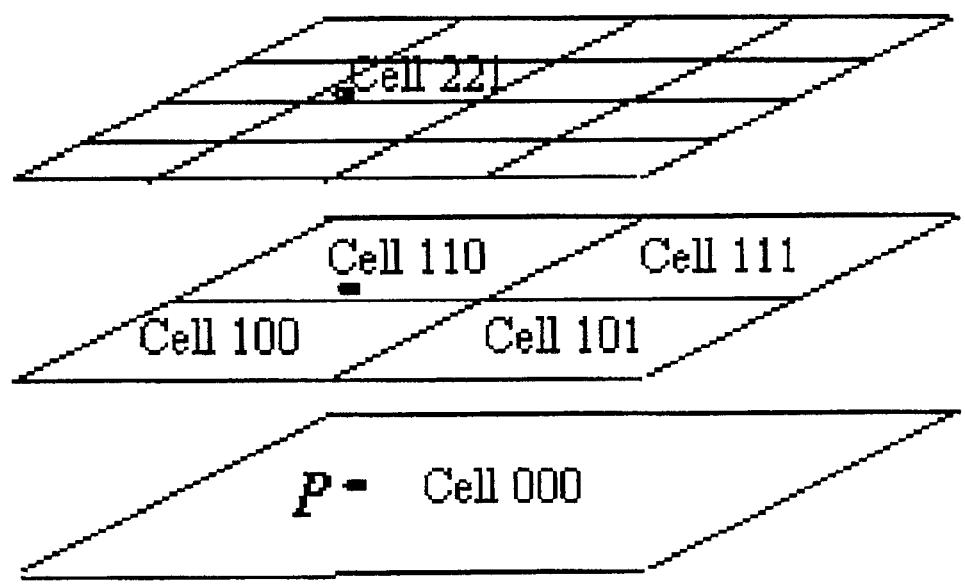
FIG. 21 illustrates the multidimensional representation of a two-dimensional feature space.

FIG. 17 shows initial values of the training points, $y_i^{(0)} = y_i$ and $c^0$ at resolution level l=0 as well as $y_i^{(1)} = y_i^{(0)} - c^0$ and $c_{\{0,1\}}{}^1$ at level 1. FIG. 18 shows initial values of the training points, $y_i^{(2)} = y_i^{(1)} - c^1$ and $c_{\{0,\ldots,3\}}{}^2$ at resolution level l=2 as well as $y_i^{(3)} = y_i^{(2)} - c^2$ and $c_{\{0,\ldots,7\}}{}^3$ at level 3. FIG. 19 shows the piece-wise constant interpolation function, obtained by summing over the cell values at all four resolution levels. FIG. 21 illustrates the multiresolution decomposition of a two-dimensional feature space into cells at resolution levels l=0,1,2. The point P belongs to $C_{00}{}^0$ at l=0, $C_{10}{}^1$ at l=1, and $C_{21}{}^2$ at l=2.

In the D dimensional feature space, the number of cells at resolution level l is $2^{Dl}$, which is usually much larger than the number of training points M. Therefore, the percentage of the non-empty cells is exponentially decreasing with the increase of the resolution level l.

For efficient storage and query, the non-empty cells are stored as a tree (FIG. 22), where the root corresponds to the largest cell $C^0$ and the descendants of the root correspond to non-empty smaller cells at higher resolution levels. The depth of the tree MaxLev should not exceed 5 for most practical cases, as it corresponds to the decomposition of the feature space into $2^{D\,MaxLev}$ cells.

For an arbitrary point $\vec{x}$, there is exactly one cell, containing it at every resolution level (FIG. 21). The value $f(\vec{x})$ equals to the sum of the values of all the cells that contain $\vec{x}$.

Every tree node at level l corresponds to some cell $C_{j_1,\ldots,j_D}{}^l$ and is stored as a structure treenode:

struct treenode{float cellval; int pnum; int sonnum; int level; sonstree* sonpntrs;}

The value of C is stored in cellval, the number of points that are inside C in pnum, its level in level and the pointers to its non-empty sons at the level l+1 in sonpntrs.

Figure 22:
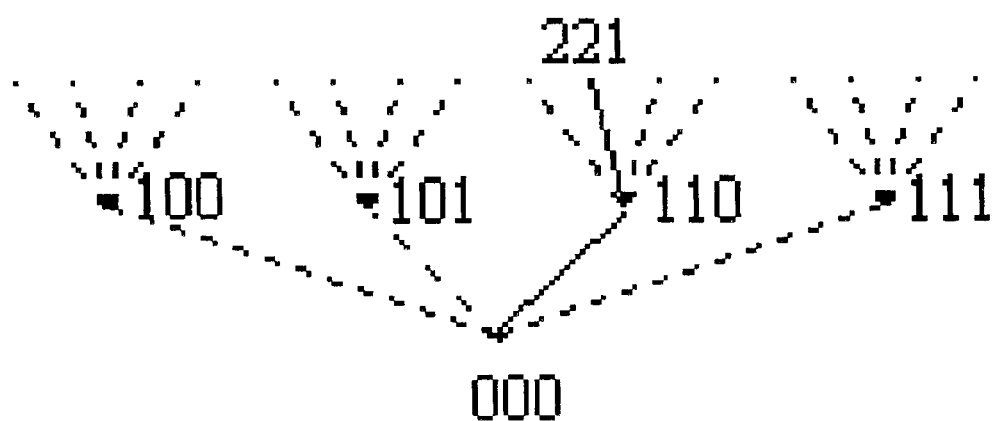
FIG. 22 illustrates a tree structure used to represent the subregions or cells of a the two-dimensional feature space of FIG. 21.

FIG. 21 shows a two dimensional feature space divided into cells at the first three resolution levels. FIG. 22 shows the organization of these cells into a tree structure.

The classifier consists of two algorithms. The first gets a new training point $\{\vec{x},y\}$ and a pointer to the tree T, and 'learns' the point by an appropriate update of the tree T. The second algorithm gets a query $\vec{x}$ and a pointer to the tree T, and provides an answer $y = y(\vec{x}, T)$ for this query.

The learning algorithm runs as follows:

Procedure LearnPoint(tn, $\vec{x}$, y) receives three arguments. The structure tn is a vertex of the tree T, it contains the information about a cell $C_{j_1,\ldots,j_D}{}^l$. Items $\vec{x}$ and y are the coordinate and the residual value $y^{(l)}$ of the training point to be learned.

The procedure calculates the value delta that will update the cell value tn→val. The delta is calculated on the basis of the old value of the cell tn→val, previous number of points that contributed to the cell tn→pnum and the residual value of the training point y. Then, the residual y is updated to contain only the value which is not yet approximated. The number of the contributing points tn→pnum is incremented to account for the new training point.

If tn corresponds to a cell that is not at the highest resolution level, then the sons of tn, that already exist, are updated by UpdateSons( ), and the LearnPoint( ) procedure is repeated recursively for the son that contains $\vec{x}$. Procedure GetSon1( ) returns a pointer to such a son. If this son does not exist (there were no training points inside his cell, before) it is created by GetSon1( ).

The procedure UpdateSons(tn, (−delta)) decrements by delta the value of each existing son of tn, in order to preserve the value of f inside the son's cells.

1. Procedure LearnPoint(tn, $\vec{x}$, y)

2. delta = $\dfrac{y - (tn \to val)}{(tn \to pnum) + 1}$ 3. (tn→val)=(tn→val)+delta 4. y=y−(tn→val)

5. (tn→pnum)=(tn→pnum)+1

6. if ((tn→level)<MaxLev) then
7. Updatesons(tn, (−delta))
8. sn=GetSon1(tn, $\vec{x}$)
9. LearnPoint(sn, $\vec{x}$,y)
10. endif
11. return The query algorithm simply sums up the values of cells that contain $\vec{x}$ at all resolution levels, $0 \le 1 \le$ MaxLev:

1. Procedure Query(tn, $\vec{x}$)
2. sn=GetSon2(tn, $\vec{x}$)
3. if (sn≠NULL) then
4. answer=Query(sn, $\vec{x}$)
5. endif
6. answer=answer+(tn→val)
7. return answer The Query(tn, $\vec{x}$) starts at the root cell $C^0$ and proceeds recursively while there exist son cells, containing $\vec{x}$. The cell at level MaxLev has no sons by construction, however, it is possible that starting from some level $l_{max}$<MaxLev, a son cell does not exist if there were no training points contributing to it. In these cases GetSon2( ) returns NULL.

The learning and query algorithms, described above, implement construction and evaluation of the function (8) defined by (9) and (10). The resulting function interpolates the values of the training set, provided MaxLev is large enough, i.e., there is at most one training point in the cell of the highest resolution level or several training points with the same value (see the paper by Blayvas et al mentioned above).

The interpolating function $f$, constructed by Learn Point( ) and evaluated by Query( ) is discontinuous along the cell boundaries, which leads to suboptimal performance of the classifier. The simple way to make $f$ continuous and smooth is to modify the Query( ) procedure. In the SmoothQuery( ) procedure below, not only the values of the cells that contain $\vec{x}$ are summed up, but also the neighboring cells, with their contribution $\phi(r)$ that depends on their distance r from $\vec{x}$.

This corresponds to the calculation of $c_{j_1,\ldots,j_D}^l$ in the basis defined by (9) and (10) and reconstruction of $f$ in another basis, with overlapping (non-orthogonal) basis functions of neighboring cells (see FIG. 170).

The smooth approximation query algorithm runs as follows:

1. Procedure SmoothQuery(tn, $\vec{x}$)
2. sonnum=GetSon3(tn, $\vec{x}$,sons)
3. for ( i=0;i<sonnum;i++)
4. answer=SmoothQuery(sons[i], $\vec{x}$)
5. endfor
6. answer=answer+(tn→val)·$\phi$(tn→center, $\vec{x}$,tn→level)
7. return answer The function GetSon3(tn) finds, among the sons of tn, cells that are close enough to $\vec{x}$ and assigns pointers to these sons in the array sons[ ]. The procedure $\phi$(tn→center, $\vec{x}$,tn→level) calculates the contribution of every such cell to the answer. This contribution is a function of the distance between the cells center, stored in tn→center and the query coordinate $\vec{x}$, prescaled with respect to the resolution level l, $$\phi(\vec{x}, \vec{y}, l) = e^{-\left|\frac{\vec{x}-\vec{y}}{2^l}\right|^2 \frac{D}{2}}. \qquad (11)$$

In relation to the training time, the procedure Learn Point( ) performs the operations in lines 2–5 in constant time and the procedure GetSon( ) returns a pointer to the unique son (among up to $2^D$ cells), that contains the training point, in $O(\lg(2^D))=O(D)$ operations. The call to procedure UpdateSons( ) in line 7 can take as much as $O(\min\{2^D,M\})$ operations, which is the maximal number of sons. However, the number of sons of a single cell at level l is on average less than $$\min\left\{\frac{M}{2^{l \times D}}, 2^D\right\}.$$

The root has the largest number of sons, however, a slight modification of the LearnPoint( ) allows to update them only once, at the end of the training phase. For this modified learning algorithm, the learning complexity of a single training point can be estimated by $$O\left(\min\left\{2^D, \frac{M}{2^D}\right\}\right).$$

In both cases, the complexity of learning a training point is bounded by the constant $2^D$.

As far as memory requirement is concerned, in the worst case every training point occupies MaxLev−1 independent cells. In this case the memory needed for storage of the tree is O(MaxLev·M)=O(M) . However, in the case of a redundant training set, where some training points are encountered several times or close training points have the same values, they occupy the same cells.

FIGS. 8 and 9 illustrate the decomposition of two dimensional feature spaces for two different training sets. One can see that the first, 'simpler' training set requires less coefficients than the second one.

As far as the query time is concerned, , the Query( ) calls to the GetSon2( ) procedure up to MaxLev times, GetSon2( ) returns the pointer to the relevant cell in the O(D) time. Besides this, Query( ) has one comparison (line 3) and one addition (line 6). Therefore, the Query( ) complexity is O(MaxLev·D), taking D=10 and MaxLev=5, the number of processor operations per query is estimated to be MaxLev·(2+D)=60. For most queries, the cells at the high resolution levels do not exist, and the query involves fewer operations (see line 3).

The query time of the SmoothQuery( ) procedure depends on the number of sons that are returned by the GetSon3( ) procedure. In the case where the number of the neighboring cells that are evaluated at every resolution level is bounded by a constant A, the query time is O(A·MaxLev·D).

The proposed method was implemented in VC++ 6.0 and run on 'IBM PC 300 PL' with 600 MHZ Pentium III processor and 256 MB RAM. It was tested on the well-known Pima Indians Diabetes dataset (see UCI repository of machine learning databases, Blake and Merz, http://www.ics.uci.edu/~mlearn/MLRepository.html, 1998, University of California, Irvine, Dept. Of Information and Computer Sciences), and a large artificial dataset generated with the DatGen program (see "Datgen: A program that creates structured data" by Melli (http://www.datgen.com), the entire content of which is herein incorporated by reference). The results were compared to the Smooth SVM method (for which see "SSVM: A smooth support vector machine for classification" by Lee and Mangasarian (1999), the entire content of which is herein incorporated by reference) and Sparse Grids (for which see the Garcke et al reference mentioned above).

Figure 23:
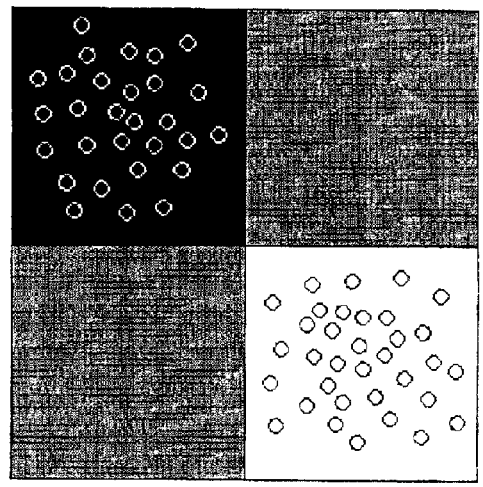
FIG. 23 shows the partitioning achieved for two-dimensional feature space with a simple training set.
Figure 24:
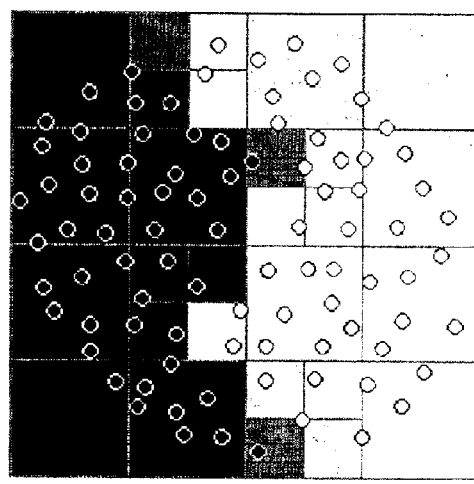
FIG. 24 shows the partitioning achieved for two-dimensional feature space with a complex training set.

FIG. 23 shows the partitioning achieved for two-dimensional feature space with a simple training set. FIG. 24 shows the partitioning achieved for two-dimensional feature space with a complex training set.

In a first example, the Pima Indians Diabetes training points were prescaled into a $[0,1]^8$ cube and the histogram was equalized along each coordinate. The classification performance was tested with a 'leave-one-out' procedure. The results for this dataset are shown in the table shown in FIG. 25.

The table presents classification performance both for familiar training points (Train Performance) and the new queries (Test Performance), the training and the query times (per training point) and the memory required for the storage of the learning tree. The first column presents the results for the interpolation algorithm (procedure Query( )), while the second column for approximation (procedure SmoothQuery( )). One can see that approximation takes $10^3$ longer time, since in the function evaluation not only the cells, containing the training point but also their neighbor cells are taken into account.

This training set is relatively small and cannot really benefit remarkably from the speed and memory efficiency of the proposed method. The training set size M=768−1=767 is comparable to the number of the cells at the first resolution level $2^D$=256 (M<~$2^D$), therefore, this is the sparse case, what explains the advantage of SmoothQuery( ).

The classification performance of 76.16%, achieved by SmoothQuery( ) is slightly lower than the best result of 78.12% for SSVM from the Lee and Mangasarian study. However our training time of 24.8·$10^{-6}$·768·10=0.19 sec for 10-fold cross-validation is better than 1.54 sec on 64 UltraSPARC II 250 MHz processors with 8 Gbyte RAM in the Lee and Mangasarian study. This shows that our method is two orders of magnitude better in the training speed.

The best performance achieved in the Garcke et al study was 77.47% at level 1 and 75.01% at level 2. The training time was 2–3 minutes for level 1 and ~30 minutes for level 2, while the required memory was 250 MB for level 2 (ascertained from a private communication from Garcke). This shows the advantage of our method ~$10^4$ times better in training speed and ~$10^4$ times better in memory.

A second example is the large artificially generated dataset in 6-dimensional feature space with up to 500,000 training points. This dataset was generated with the Datgen program (see the Melli reference mentioned above) using the command string:

sh>datgen −r1−X0/100, R,O:0/100, R,O:0/100, R,O:0/100, R,O:0/100, R,O:0/200, R,O:0/200 −R2 −C2/4−D2/5 −T10/60−O5020000 −p −e0.15

In order to compare, DatGen is used as in Section 3.2.2 of the Garcke et al reference mentioned above.

The table of FIG. 26 shows the results of Garcke et al and the corresponding results obtained by our method. The results of Garcke et al are shown in the upper part, while our results appear at the lower part of the table.

The processing times for our method do not include the loading time from a disk, which was 2.05 sec for 50 k points and 20.5 sec for 500 k points. One can see that both training and testing correctness are similar in both methods at resolution levels 1 and 2. However, our approach has an essential run-time advantage.

In summary, we proposed to approach the classification problem as a problem of constructing an approximation function $f$ of the training set. This approximation is constructed with a multi-resolution sparse grid and organized in a tree-structure. For low dimensional training sets (e.g. D<~10) this gives an advantage in both runtime and memory usage, while maintaining classification performances comparable to the best reported results of existing techniques.

We consider the classification problem as a problem of approximating a given training set. This approximation is constructed as a multi-resolution sparse grid, and organized in a tree-structure. It allows efficient training and query, both in constant time per training point, for low-dimensional classification problems (D<~10) with large data sets. The memory required for such problems is usually substantially smaller than the size of the training set.

What is claimed is:

1. Data processing apparatus for evaluating answers to respective query items considered to be represented by respective points within a region of feature space, which region is subdivided into subregions according to at least first and second subdivisions, said apparatus comprising:

an input which receives such a query item;

a subregion identifying portion operable, for each said subdivision of said region, to identify which said subregion of the subdivision contains the point representing the received query item;

a partial answer retrieval portion having access when the apparatus is in use to a store of precalculated partial answers for at least some said subregions of said subdivisions, and operable to retrieve from the store the partial answers for the identified subregion that is present in the store;

an answer calculation portion which calculates an answer to said received query item based on the retrieved partial answers; and an output which outputs the calculated answer.

2. Data processing apparatus according to claim 1, wherein said answer calculation portion calculates an answer to said received query item by summing said retrieved partial answers.

3. Data processing apparatus according to claim 1, wherein one of said subdivisions contains a single subregion.

4. Data processing apparatus according to claim 3, wherein said single subregion covers the whole of said region of feature space under consideration.

5. Data processing apparatus according to claim 1, wherein each said subdivision represents a particular level of resolution and the region of feature space is subdivided into subregions of a particular size according to the level of resolution for the subdivision concerned.

6. Data processing apparatus according to claim 5, wherein the second subdivision has a higher level of resolution than the first subdivision, and so on for further subdivisions, if any.

7. Data processing apparatus according to claim 5, wherein the region of feature space is subdivided into $2^{LD}$ subregions, where L is the level of resolution and D is the dimension of feature space.

8. Data processing apparatus according to claim 1, wherein the subregions of any one subdivision are non-overlapping with another subregion of that subdivision.

9. Data processing apparatus according to claim 1, wherein said partial answer retrieval portion is operable to retrieve from said store further partial answers for one or more subregions surrounding the or each subregion identified by said subregion identifying portion, and said answer calculation portion calculates an answer to said received query item based on the retrieved partial answers for all such subregions.

10. Data processing apparatus according to claim 9, wherein said answer calculation portion calculates an answer to said received query item by forming a weighted sum of said retrieved partial answers, the weight for a particular partial answer being set in dependence upon the distance of the surrounding subregion associated with that partial answer from the subregion identified by said subregion identifying portion.

11. Data processing apparatus according to claim 1, wherein said answer is considered to be represented by a point within a region output space of one or more dimensions.

12. Data processing apparatus according to claim 1, wherein a query item comprises a set of measurement values and said answer represents a class assignment or decision based on those measurement values.

13. Data processing apparatus according to claim 1, wherein the apparatus is a learning machine which approximates an arbitrary decision function.

14. Data training apparatus for analyzing query items, considered to be represented by respective training points within a region of feature space, and respective known answers to the query items to determine partial answers for use in evaluating answers to new query items, said apparatus comprising:
a region subdividing portion operable to subdivide said region into subregions according to at least first and second subdivisions;
an iteration portion which performs at least first and second iterations, corresponding respectively to said first and second subdivisions, and operable in each said iteration to calculate a partial answer for each subregion of the corresponding subdivision in dependence upon known answers to query items represented by training points, if any, in the subregion concerned and to adjust said known answers in dependence upon those partial answers so that the adjusted known answers are usable by a subsequent iteration, if any; and
an output which outputs the calculated partial answers.

15. Data training apparatus according to claim 14, wherein said partial answer for each subregion is calculated as the average of all the known answers to query items represented by training points, if any, in the subregion concerned.

16. Data training apparatus according to claim 14, wherein said iteration portion is operable in each said iteration to calculate a partial answer for each subregion of the corresponding subdivision in dependence both upon known answers to query items represented by training points, if any, in the subregion concerned and upon known answers to query items represented by training points, if any, in one or more subregions surrounding the subregion concerned.

17. Data training apparatus according to claim 14, wherein said iteration portion is operable in each said iteration to calculate a count value for each subregion of the corresponding subdivision in dependence upon the number of known answers to query items represented by training points, if any, in the subregion concerned, the apparatus further comprising an additional output which outputs the calculated count values.

18. Data training apparatus according to claim 14, wherein said known answers are adjusted by subtracting from said known answer the corresponding respective partial answers.

19. Data training apparatus according to claim 14, further comprising a storage portion which is operable to store said calculated partial answers.

20. Data training apparatus according to claim 19, wherein said storage portion allocates a storage location within the storage portion to hold a partial value for a subregion only if that subregion has at least one query item represented by a training point in the subregion.

21. Data training apparatus according to claim 20, wherein said storage portion is of a sparse grid type.

22. Data updating apparatus for analyzing training query items and respective known answers to the training query items, said training query items being considered to be represented by respective training points within a region of feature space and said region being subdivided into subregions according to at least first and second subdivisions, to update precalculated partial answers usable to evaluate answers to new query items, said apparatus comprising:
an input which receives such a training query item;
a subregion identifying portion operable, for each said subdivision of said region, to identify which said subregion of the subdivision contains the point representing the received training query item;
a partial answer retrieval portion having access when the apparatus is in use to a store of said precalculated partial answers for at least some said subregions of said subdivisions, and operable to retrieve from the store the partial answers for the identified subregion that is present in the store;
an iteration portion which performs at least first and second iterations, corresponding respectively to said first and second subdivisions, and operable in each such iteration to update the partial answer stored for the identified subregion of the corresponding subdivision in dependence upon said known answer to said received training query item and said retrieved precalculated partial answer for the identified subregion, and to adjust said known answer in dependence upon that updated partial answer so that the adjusted known answer is usable by a subsequent iteration, if any.

23. Data updating apparatus according to claim 22, wherein said iteration portion is further operable in each such iteration to update the partial answer stored for one or more subregions surrounding the identified subregion.

24. Data updating apparatus according to claim 22, further comprising a count value retrieval portion having access when the apparatus is in use to a store of precalculated count values for at least some said subregions of said subdivision, and operable to retrieve from the store the count values for the or each identified subregion that is present in the store, and wherein said iteration portion is operable in each such iteration to update the partial answer stored for the identified subregion of the corresponding subdivision in dependence upon said known answer to said received training query item, said retrieved precalculated partial answer for the identified subregion, and said retrieved count value for the identified subregion.

25. Data updating apparatus according to claim 24, wherein the partial answer is updated by calculating a first value equal to the known answer minus the partial answer and a second value equal to the count value plus one, and adding to the partial answer the result of the first value divided by the second value.

26. Data updating apparatus according to claim 24, wherein said iteration portion is operable to update the count value stored for the identified subregion of the corresponding subdivision in dependence upon said retrieved count value for the identified subregion.

27. Data updating apparatus according to claim 26, wherein said count value stored for the identified subregion is updated by incrementing it.

28. Data updating apparatus according to claim 22, wherein said known answer is adjusted by subtracting from said known answer the updated partial answer.

29. A computer-implemented data processing method for evaluating answers to respective query items considered to be represented by respective points within a region of feature space, which region is subdivided into subregions according to at least first and second subdivisions, said method comprising:

receiving such a query item;

identifying, for each said subdivision of said region, which said subregion of the subdivision contains the point representing the received query item;

accessing a store of precalculated partial answers for at least some said subregions of said subdivisions to retrieve from the store the partial answers for the identified subregion that is present in the store;

calculating an answer to said received query item based on the retrieved partial answers; and outputting the calculated answer.

30. A computer-implemented data training method for analyzing query items, considered to be represented by respective training points within a region of feature space, and respective known answers to the query items to determine partial answers for use in evaluating answers to new query items, said method comprising:

subdividing said region into subregions according to at least first and second subdivisions;

performing at least first and second iterations, corresponding respectively to said first and second subdivisions, and in each said iteration calculating a partial answer for each subregion of the corresponding subdivision in dependence upon known answers to query items represented by training points, if any, in the subregion concerned and adjusting said known answers in dependence upon those partial answers so that the adjusted known answers are usable by a subsequent iteration, if any; and outputting the calculated partial answers.

31. A computer-implemented data updating method for analyzing training query items and respective known answers to the training query items, said training query items being considered to be represented by respective training points within a region of feature space and said region being subdivided into subregions according to at least first and second subdivisions, to update precalculated partial answers usable to evaluate answers to new query items, said method comprising:

receiving such a training query item;

identifying, for each said subdivision of said region, which said subregion of the subdivision contains the point representing the received training query item;

accessing a store of said precalculated partial answers for at least some said subregions of said subdivisions to retrieve from the store the partial answers for the identified subregion that is present in the store; and performing at least first and second iterations, corresponding respectively to said first and second subdivisions, and in each such iteration updating the partial answer stored for the identified subregion of the corresponding subdivision in dependence upon said known answer to said received training query item and said retrieved precalculated partial answer for the identified subregion, and adjusting said known answer in dependence upon that updated partial answer so that the adjusted known answer is usable by a subsequent iteration, if any.

32. A computer-readable recording medium storing a program for evaluating answers to respective query items considered to be represented by respective points within a region of feature space, which region is subdivided into subregions according to at least first and second subdivisions, said program comprising:

a receiving code portion which receives such a query item;

a subregion identifying code portion which identifies, for each said subdivision of said region, which said subregion of the subdivision contains the point representing the received query item;

a partial answer retrieval code portion which accesses a store of precalculated partial answers for at least some said subregion of said subdivisions to retrieve from the store the partial answers for the identified subregion that is present in the store;

an answer calculation code portion which calculates an answer to said received query item based on the retrieved partial answers; and an output code portion which outputs the calculated answer.

33. A computer-readable recording medium storing a program for analyzing query items, considered to be represented by respective training points within a region of feature space, and respective known answers to the query items to determine partial answers for use in evaluating answers to new query items, said program comprising:

a region subdividing code portion which subdivides said region into subregions according to at least first and second subdivisions;

an iteration code portion which performs at least first and second iterations, corresponding respectively to said first and second subdivisions, and in each said iteration calculating a partial answer for each subregion of the corresponding subdivision in dependence upon known answers to query items represented by training points, if any, in the subregion concerned and adjusting said known answers in dependence upon those partial answers so that the adjusted known answer are usable by a subsequent iteration, if any; and an output code portion which outputs the calculated partial answers.

34. A computer-readable recording medium storing a program for analyzing training query items and respective known answers to the training query items, said training query items being considered to be represented by respective training points within a region of feature space and said region being subdivided into subregions according to at least first and second subdivisions, to update precalculated partial answers usable to evaluate answers to new query items, said program comprising:

an input code portion which receives such a training query item;

a subregion identifying code portion which identifies, for each said subdivision of said region, which said subregion of the subdivision contains the point representing the received training query item;

a partial answer retrieval code portion which accesses a store of said precalculated partial answers for at least some said subregions of said subdivisions to retrieve from the store the partial answers for the identified subregion that is present in the store; and an iteration code portion which performs at least first and second iterations, corresponding respectively to said first and second subdivisions, and in each such iteration updating the partial answer stored for the identified subregion of the corresponding subdivision in dependence upon said known answer to said received training query item and said retrieved precalculated partial answer for the identified subregion, and adjusting said known answer in dependence upon that updated partial answer so that the adjusted known answer is usable by a subsequent iteration, if any.

35. A computer-readable recording medium storing partial answers created by a computer-implemented data training method for analyzing query items, considered to be represented by respective training points within a region of feature space, and respective known answers to the query items to determine partial answers for use in evaluating answers to new query items, said method comprising:

subdividing said region into subregions according to at least first and second subdivisions;

performing at least first and second iterations, corresponding respectively to said first and second subdivisions, and in each said iteration calculating a partial answer for each subregion of the corresponding subdivision in dependence upon known answers to query items represented by training points, if any, in the subregion concerned and adjusting said known answers in dependence upon those partial answers so that the adjusted known answers are usable by a subsequent iteration, if any; and outputting the calculated partial answers.

36. Data processing apparatus for evaluating answers to respective query items considered to be represented by respective points within a region of feature space, which region is subdivided into subregions according to at least first and second subdivisions, said apparatus comprising:

an input for receiving such a query item;

subregion identifying means operable, for each said subdivision of said region, to identify which said subregion of the subdivision contains the point representing the received query item;

partial answer retrieval means having access when the apparatus is in use to a store of precalculated partial answers for at least some said subregions of said subdivisions, and operable to retrieve from the store the partial answers for the identified subregion that is present in the store;

answer calculation means for calculating an answer to said received query item based on the retrieved partial answers; and an output for outputting the calculated answer.

37. Data training apparatus for analyzing query items, considered to be represented by respective training points within a region of feature space, and respective known answers to the query items to determine partial answers for use in evaluating answers to new query items, said apparatus comprising:

region subdividing means operable to subdivide said region into subregions according to at least first and second subdivisions;

iteration means for performing at least first and second iterations, corresponding respectively to said first and second subdivisions, and operable in each said iteration to calculate a partial answer for each subregion of the corresponding subdivision in dependence upon known answers to query items represented by training points, if any, in the subregion concerned and to adjust said known answers in dependence upon those partial answers so that the adjusted known answers are usable by a subsequent iteration, if any; and output means for outputting the calculated partial answers.

38. Data updating apparatus for analyzing training query items and respective known answers to the training query items, said training query items being considered to be represented by respective training points within a region of feature space and said region being subdivided into subregions according to at least first and second subdivisions, to update precalculated partial answers usable to evaluate answers to new query items, said apparatus comprising:

an input for receiving such a training query item; subregion identifying means operable, for each said subdivision of said region, to identify which said subregion of the subdivision contains the point representing the received training query item;

partial answer retrieval means having access when the apparatus is in use to a store of said precalculated partial answers for at least some said subregions of said subdivisions, and operable to retrieve from the store the partial answers for the identified subregion that is present in the store;

iteration means for performing at least first and second iterations, corresponding respectively to said first and second subdivisions, and operable in each such iteration to update the partial answer stored for the identified subregion of the corresponding subdivision in dependence upon said known answer to said received training query item and said retrieved precalculated partial answer for the identified subregion, and to adjust said known answer in dependence upon that updated partial answer so that the adjusted known answer is usable by a subsequent iteration, if any.

* * * * *